US010215309B2

(12) United States Patent
Leber et al.

(10) Patent No.: US 10,215,309 B2
(45) Date of Patent: Feb. 26, 2019

(54) SHOWER ARM ATTACHMENT ASSEMBLY

(71) Applicant: WATER PIK, INC., Fort Collins, CO (US)

(72) Inventors: Leland C. Leber, Fort Collins, CO (US); Gary D. Golichowski, Cheyenne, WY (US); Michael J. Quinn, Windsor, CO (US)

(73) Assignee: WATER PIK, INC., Fort Collins, CO (US)

( * ) Notice: Subject to any disclaimer, the term of this patent is extended or adjusted under 35 U.S.C. 154(b) by 39 days.

(21) Appl. No.: 15/644,562

(22) Filed: Jul. 7, 2017

(65) Prior Publication Data

US 2017/0304859 A1     Oct. 26, 2017

Related U.S. Application Data

(60) Continuation of application No. 14/470,120, filed on Aug. 27, 2014, now Pat. No. 9,700,909, which is a
(Continued)

(51) Int. Cl.
*A47K 3/28* (2006.01)
*B05B 1/18* (2006.01)
(Continued)

(52) U.S. Cl.
CPC ............ *F16L 3/16* (2013.01); *A47K 3/28* (2013.01); *B05B 15/65* (2018.02); *B05B 15/652* (2018.02); *E03C 1/06* (2013.01); *B05B 1/18* (2013.01)

(58) Field of Classification Search
CPC ..... F16L 3/16; F16L 27/0828; F16L 27/0861; F16L 27/0845; F16L 27/0816;
(Continued)

(56) References Cited

U.S. PATENT DOCUMENTS

| 203,094 A | 4/1878 | Wakeman |
| 428,023 A | 5/1890 | Schoff |

(Continued)

FOREIGN PATENT DOCUMENTS

| AU | 687527 | 11/1996 |
| CA | 659510 | 3/1963 |

(Continued)

OTHER PUBLICATIONS

Decision on Appeal mailed Jun. 30, 2016, in U.S. Appl. No. 11/869,183, 9 pages.
(Continued)

*Primary Examiner* — Justin M Jonaitis
(74) *Attorney, Agent, or Firm* — Dorsey & Whitney LLP

(57) ABSTRACT

A shower arm attachment assembly including an arm coupling member, a shower pipe coupling member, and a locking member. The arm coupling member may fluidly connect to a shower arm for a showerhead and the shower pipe coupling member may fluidly connect to a shower pipe. The arm coupling member connects to the shower pipe coupling member and is selectively rotatably relative thereto. The locking member selectively controls rotation of the arm coupling member relative to the shower pipe coupling member.

13 Claims, 14 Drawing Sheets

Related U.S. Application Data division of application No. 11/869,183, filed on Oct. 9, 2007.

(60) Provisional application No. 60/828,741, filed on Oct. 9, 2006.

(51) Int. Cl.

| | | |
|---|---|---|
| *E03C 1/06* | (2006.01) | |
| *F16L 3/16* | (2006.01) | |
| *B05B 15/65* | (2018.01) | |
| *B05B 15/652* | (2018.01) | |

(58) Field of Classification Search
 CPC ...... F16L 27/08; F16L 27/0812; B05B 15/65;
 B05B 15/652; B05B 1/18; B05B 15/066;
 B05B 15/68; B05B 15/628; B05B 15/656;
 A47K 3/28; E02C 1/06
 USPC ....... 239/587.5, 587.1, 587.2, 587.6; 285/98,
 285/121.6, 127.1, 145.2, 147.1, 148.15,
 285/148.4, 272, 276, 280
 See application file for complete search history.

(56) References Cited

U.S. PATENT DOCUMENTS

| | | | |
|---|---|---|---|
| 445,250 A | 1/1891 | Lawless | |
| 486,986 A | 11/1892 | Schinke | |
| 566,410 A | 8/1896 | Schinke | |
| 570,405 A | 10/1896 | Jerguson et al. | |
| 800,802 A | 10/1905 | Franquist | |
| 832,523 A | 10/1906 | Andersson | |
| 854,094 A | 5/1907 | Klein | |
| 926,929 A | 7/1909 | Dusseau | |
| 1,001,842 A | 8/1911 | Greenfield | |
| 1,003,037 A | 9/1911 | Crowe | |
| 1,018,143 A | 2/1912 | Vissering | |
| 1,193,302 A | 8/1916 | Seltner | |
| 1,207,380 A | 12/1916 | Duffy | |
| 1,217,254 A | 2/1917 | Winslow | |
| 1,218,895 A | 3/1917 | Porter | |
| 1,255,577 A | 2/1918 | Berry | |
| 1,260,181 A | 3/1918 | Garnero | |
| 1,276,117 A | 8/1918 | Riebe | |
| 1,284,099 A | 11/1918 | Harris | |
| 1,327,428 A | 1/1920 | Gregory | |
| 1,451,800 A | 4/1923 | Agner | |
| 1,469,528 A | 10/1923 | Owens | |
| 1,500,921 A | 7/1924 | Bramson et al. | |
| 1,560,789 A | 11/1925 | Johnson et al. | |
| 1,597,477 A | 8/1926 | Panhorst | |
| 1,692,394 A | 11/1928 | Sundh | |
| 1,695,263 A | 12/1928 | Jacques | |
| 1,724,147 A | 8/1929 | Russell | |
| 1,736,160 A | 11/1929 | Jonsson | |
| 1,754,127 A | 4/1930 | Srulowitz | |
| 1,758,115 A | 5/1930 | Kelly | |
| 1,778,658 A | 10/1930 | Baker | |
| 1,821,274 A | 9/1931 | Plummer | |
| 1,906,575 A | 5/1933 | Goeriz | |
| 2,011,446 A | 8/1935 | Judell | |
| 2,024,930 A * | 12/1935 | Judell | E03C 1/06 285/144.1 |
| 2,044,445 A | 6/1936 | Price et al. | |
| 2,117,152 A | 5/1938 | Crosti | |
| 2,196,783 A | 4/1940 | Shook | |
| 2,197,667 A | 4/1940 | Shook | |
| 2,204,856 A | 6/1940 | Hinrichs | |
| 2,268,263 A | 5/1941 | Newell et al. | |
| 2,342,757 A | 2/1944 | Roser | |
| D147,258 S | 8/1947 | Becker | |
| D152,584 S | 2/1949 | Becker | |
| 2,467,954 A | 4/1949 | Becker | |
| 2,472,030 A | 5/1949 | Thulin | |
| 2,546,348 A | 3/1951 | Schuman | |
| 2,581,129 A | 1/1952 | Muldoon | |
| D166,073 S | 3/1952 | Dunkelberger | |
| 2,648,762 A | 8/1953 | Dunkelberger | |
| 2,664,271 A | 12/1953 | Arutunoff | |
| 2,676,806 A | 4/1954 | Bachman | |
| 2,679,575 A | 5/1954 | Haberstump | |
| 2,680,358 A | 6/1954 | Zublin | |
| 2,721,089 A | 10/1955 | Shames | |
| 2,759,765 A | 8/1956 | Pawley | |
| 2,776,168 A | 1/1957 | Schweda | |
| 2,825,135 A | 3/1958 | Tilden | |
| 2,873,999 A | 2/1959 | Webb | |
| 2,931,672 A | 4/1960 | Merritt et al. | |
| 2,966,311 A | 12/1960 | Davis | |
| D190,295 S | 5/1961 | Becker | |
| D192,935 S | 5/1962 | Becker | |
| 3,032,357 A | 5/1962 | Shames et al. | |
| 3,034,809 A | 5/1962 | Greenberg | |
| 3,064,998 A * | 11/1962 | Syverson | F16L 27/08 285/101 |
| 3,095,892 A | 7/1963 | Laing et al. | |
| 3,103,723 A | 9/1963 | Becker | |
| 3,111,277 A | 11/1963 | Grimsley | |
| 3,121,235 A | 2/1964 | Gellmann | |
| 3,143,857 A | 8/1964 | Eaton | |
| 3,196,463 A | 7/1965 | Farneth | |
| 3,231,200 A | 1/1966 | Heald | |
| 3,266,059 A | 8/1966 | Stelle | |
| 3,306,634 A | 2/1967 | Groves et al. | |
| 3,329,967 A | 7/1967 | Martinez et al. | |
| 3,389,925 A | 6/1968 | Gottschald | |
| 3,393,311 A | 7/1968 | Dahl | |
| 3,393,312 A | 7/1968 | Dahl | |
| 3,402,893 A | 9/1968 | Hindman | |
| 3,492,029 A | 1/1970 | French et al. | |
| 3,546,961 A | 12/1970 | Marton | |
| 3,556,141 A | 1/1971 | Hind | |
| 3,565,116 A | 2/1971 | Gabin | |
| 3,584,822 A | 6/1971 | Oram | |
| 3,612,577 A | 10/1971 | Pope | |
| 3,641,333 A | 2/1972 | Gendron | |
| 3,663,044 A | 5/1972 | Contreras et al. | |
| 3,669,362 A | 6/1972 | Meyerhofer et al. | |
| 3,669,470 A | 6/1972 | Deurloo | |
| 3,685,745 A | 8/1972 | Peschcke-Koedt | |
| 3,731,084 A | 5/1973 | Trevorrow | |
| 3,754,779 A | 8/1973 | Peress | |
| 3,778,610 A | 12/1973 | Wolf | |
| 3,860,271 A | 1/1975 | Rodgers | |
| 3,861,719 A | 1/1975 | Hand | |
| 3,869,151 A | 3/1975 | Fletcher et al. | |
| 3,910,277 A | 10/1975 | Zimmer | |
| D237,708 S | 11/1975 | Grohe | |
| 3,929,164 A | 12/1975 | Richter | |
| 3,931,992 A | 1/1976 | Coel | |
| D240,178 S | 6/1976 | Johansen | |
| D240,322 S | 6/1976 | Staub | |
| 3,971,074 A | 7/1976 | Yxfeldt | |
| 4,005,880 A | 2/1977 | Anderson et al. | |
| 4,006,920 A | 2/1977 | Sadler et al. | |
| 4,023,782 A | 5/1977 | Eifer | |
| 4,045,054 A | 8/1977 | Arnold | |
| D249,356 S | 9/1978 | Nagy | |
| 4,162,801 A | 7/1979 | Kresky et al. | |
| 4,174,822 A | 11/1979 | Larsson | |
| 4,243,253 A | 1/1981 | Rogers, Jr. | |
| 4,258,414 A | 3/1981 | Sokol | |
| D259,054 S | 4/1981 | Petersons | |
| 4,274,400 A | 6/1981 | Baus | |
| 4,282,612 A | 8/1981 | King | |
| D262,353 S | 12/1981 | Kitson | |
| 4,358,056 A | 11/1982 | Greenhut et al. | |
| D268,442 S | 3/1983 | Darmon | |
| D268,609 S | 4/1983 | Thompson | |
| 4,383,554 A | 5/1983 | Merriman | |
| 4,396,797 A | 8/1983 | Sakuragi et al. | |
| 4,425,965 A | 1/1984 | Bayh, III et al. | |
| 4,465,308 A | 8/1984 | Martini | |

(56) References Cited

U.S. PATENT DOCUMENTS

| | | | |
|---|---|---|---|
| 4,479,610 A | 10/1984 | Etheridge et al. | |
| 4,495,550 A | 1/1985 | Visciano | |
| 4,540,202 A | 9/1985 | Amphoux et al. | |
| 4,545,081 A | 10/1985 | Nestor et al. | |
| 4,545,535 A | 10/1985 | Knapp | |
| 4,553,775 A | 11/1985 | Hailing | |
| D281,820 S | 12/1985 | Oba et al. | |
| 4,568,216 A | 2/1986 | Mizusawa et al. | |
| 4,571,003 A | 2/1986 | Roling et al. | |
| D283,645 S | 4/1986 | Tanaka | |
| 4,639,018 A * | 1/1987 | Froelich | F16L 27/0849 285/184 |
| 4,643,463 A | 2/1987 | Hailing et al. | |
| 4,645,244 A | 2/1987 | Curtis | |
| 4,651,770 A * | 3/1987 | Denham | F16K 3/08 137/270 |
| 4,652,025 A | 3/1987 | Conroy, Sr. | |
| 4,669,757 A | 6/1987 | Bartholomew | |
| 4,683,917 A | 8/1987 | Bartholomew | |
| 4,707,770 A | 11/1987 | Van Duyn | |
| 4,717,180 A * | 1/1988 | Roman | B60S 3/047 285/148.19 |
| 4,722,029 A | 1/1988 | Ahle et al. | |
| 4,733,337 A | 3/1988 | Bieberstein | |
| 4,739,801 A | 4/1988 | Kimura et al. | |
| 4,752,975 A | 6/1988 | Tiernan | |
| 4,790,294 A | 12/1988 | Allred, III et al. | |
| 4,809,369 A | 3/1989 | Bowden | |
| 4,839,599 A | 6/1989 | Fischer | |
| 4,842,059 A | 6/1989 | Tomek | |
| D302,325 S | 7/1989 | Charet et al. | |
| 4,850,616 A | 7/1989 | Pava | |
| 4,856,822 A | 8/1989 | Parker | |
| 4,863,328 A | 9/1989 | Malek | |
| 4,865,362 A | 9/1989 | Holden | |
| 4,871,196 A | 10/1989 | Kingsford | |
| D306,351 S | 2/1990 | Charet et al. | |
| 4,901,765 A | 2/1990 | Poe | |
| 4,901,927 A | 2/1990 | Valdivia | |
| 4,903,178 A | 2/1990 | Englot et al. | |
| 4,907,137 A | 3/1990 | Schladitz et al. | |
| 4,946,202 A | 8/1990 | Perricone | |
| 4,951,329 A | 8/1990 | Shaw | |
| 4,959,758 A | 9/1990 | Filosa et al. | |
| 4,964,573 A | 10/1990 | Lipski | |
| 4,972,048 A | 11/1990 | Martin | |
| 4,975,123 A | 12/1990 | Gray | |
| D314,246 S | 1/1991 | Bache | |
| 5,004,158 A | 4/1991 | Halem et al. | |
| 5,022,103 A | 6/1991 | Faist | |
| 5,032,015 A | 7/1991 | Christianson | |
| 5,033,528 A | 7/1991 | Volcani | |
| 5,046,764 A | 9/1991 | Kimura et al. | |
| D321,062 S | 10/1991 | Bonbright | |
| D322,681 S | 12/1991 | Yuen | |
| 5,071,070 A | 12/1991 | Hardy | |
| 5,086,878 A | 2/1992 | Swift | |
| D325,769 S | 4/1992 | Haug et al. | |
| 5,103,384 A | 4/1992 | Drohan | |
| 5,107,406 A | 4/1992 | Sekido et al. | |
| 5,134,251 A | 7/1992 | Martin | |
| 5,135,173 A | 8/1992 | Cho | |
| D329,504 S | 9/1992 | Yuen | |
| 5,143,123 A | 9/1992 | Richards et al. | |
| 5,148,556 A | 9/1992 | Bottoms, Jr. et al. | |
| 5,153,976 A | 10/1992 | Benchaar et al. | |
| 5,154,483 A | 10/1992 | Zeller | |
| 5,163,752 A | 11/1992 | Copeland et al. | |
| 5,197,767 A | 3/1993 | Kimura et al. | |
| 5,215,338 A | 6/1993 | Kimura et al. | |
| 5,220,697 A | 6/1993 | Birchfield | |
| D337,839 S | 7/1993 | Zeller | |
| D338,542 S | 8/1993 | Yuen | |
| 5,254,809 A | 10/1993 | Martin | |
| D341,220 S | 11/1993 | Eagan | |
| 5,263,646 A | 11/1993 | McCauley | |
| 5,265,833 A | 11/1993 | Heimann et al. | |
| 5,268,826 A | 12/1993 | Greene | |
| 5,276,596 A | 1/1994 | Krenzel | |
| 5,286,071 A | 2/1994 | Storage | |
| 5,288,110 A | 2/1994 | Allread | |
| D345,811 S | 4/1994 | Van Deursen et al. | |
| 5,333,787 A | 8/1994 | Smith et al. | |
| 5,333,789 A | 8/1994 | Garneys | |
| 5,340,165 A | 8/1994 | Sheppard | |
| 5,349,987 A | 9/1994 | Shieh | |
| 5,356,036 A | 10/1994 | Garnett | |
| 5,356,076 A | 10/1994 | Bishop | |
| 5,368,235 A | 11/1994 | Drozdoff et al. | |
| 5,369,556 A | 11/1994 | Zeller | |
| 5,370,427 A | 12/1994 | Hoelle et al. | |
| 5,385,500 A | 1/1995 | Schmidt | |
| D356,626 S | 3/1995 | Wang | |
| 5,398,977 A | 3/1995 | Berger et al. | |
| D361,399 S | 8/1995 | Carbone et al. | |
| 5,449,206 A | 9/1995 | Lockwood | |
| D363,360 S | 10/1995 | Santarsiero | |
| 5,468,057 A | 11/1995 | Megerle et al. | |
| D364,935 S | 12/1995 | deBlois | |
| D365,625 S | 12/1995 | Bova | |
| D365,646 S | 12/1995 | deBlois | |
| D366,707 S | 1/1996 | Kaiser | |
| D366,708 S | 1/1996 | Santarsiero | |
| D366,709 S | 1/1996 | Szymanski | |
| D366,710 S | 1/1996 | Szymanski | |
| 5,481,765 A | 1/1996 | Wang | |
| D366,948 S | 2/1996 | Carbone | |
| D367,333 S | 2/1996 | Swyst | |
| D367,934 S | 3/1996 | Carbone | |
| D368,146 S | 3/1996 | Carbone | |
| D368,317 S | 3/1996 | Swyst | |
| D368,539 S | 4/1996 | Carbone et al. | |
| D368,540 S | 4/1996 | Santarsiero | |
| D368,541 S | 4/1996 | Kaiser et al. | |
| D368,542 S | 4/1996 | deBlois et al. | |
| D369,873 S | 5/1996 | deBlois et al. | |
| D369,874 S | 5/1996 | Santarsiero | |
| D369,875 S | 5/1996 | Carbone | |
| D370,277 S | 5/1996 | Kaiser | |
| D370,278 S | 5/1996 | Nolan | |
| D370,279 S | 5/1996 | deBlois | |
| D370,280 S | 5/1996 | Kaiser | |
| D370,281 S | 5/1996 | Johnstone et al. | |
| 5,517,392 A | 5/1996 | Rousso et al. | |
| 5,521,803 A | 5/1996 | Eckert et al. | |
| D370,542 S | 6/1996 | Santarsiero | |
| D370,735 S | 6/1996 | deBlois | |
| D370,987 S | 6/1996 | Santarsiero | |
| D370,988 S | 6/1996 | Santarsiero | |
| D371,448 S | 7/1996 | Santarsiero | |
| D371,618 S | 7/1996 | Nolan | |
| D371,619 S | 7/1996 | Szymanski | |
| D371,856 S | 7/1996 | Carbone | |
| D372,318 S | 7/1996 | Szymanski | |
| D372,319 S | 7/1996 | Carbone | |
| 5,531,625 A | 7/1996 | Zhong | |
| D372,548 S | 8/1996 | Carbone | |
| D372,998 S | 8/1996 | Carbone | |
| D373,210 S | 8/1996 | Santarsiero | |
| D373,434 S | 9/1996 | Nolan | |
| D373,435 S | 9/1996 | Nolan | |
| D373,645 S | 9/1996 | Johnstone et al. | |
| D373,646 S | 9/1996 | Szymanski et al. | |
| D373,647 S | 9/1996 | Kaiser | |
| D373,648 S | 9/1996 | Kaiser | |
| D373,649 S | 9/1996 | Carbone | |
| D373,651 S | 9/1996 | Szymanski | |
| D373,652 S | 9/1996 | Kaiser | |
| D374,297 S | 10/1996 | Kaiser | |
| D374,298 S | 10/1996 | Swyst | |
| D374,299 S | 10/1996 | Carbone | |
| D374,493 S | 10/1996 | Szymanski | |
| D374,494 S | 10/1996 | Santarsiero | |
| D374,732 S | 10/1996 | Kaiser | |

(56) References Cited

U.S. PATENT DOCUMENTS

| | | | |
|---|---|---|---|
| D374,733 S | 10/1996 | Santarsiero | |
| 5,567,115 A | 10/1996 | Carbone | |
| D376,217 S | 12/1996 | Kaiser | |
| D376,860 S | 12/1996 | Santarsiero | |
| D376,861 S | 12/1996 | Johnstone et al. | |
| D376,862 S | 12/1996 | Carbone | |
| 5,624,074 A | 4/1997 | Parisi | |
| D379,404 S | 5/1997 | Spelts | |
| D381,405 S | 7/1997 | Waidele et al. | |
| 5,660,079 A | 8/1997 | Friedrich | |
| 5,667,146 A | 9/1997 | Pimentel et al. | |
| 5,667,148 A | 9/1997 | Pimentel et al. | |
| 5,692,252 A | 12/1997 | Zwezdaryk | |
| 5,749,602 A | 5/1998 | Delaney et al. | |
| 5,778,939 A | 7/1998 | Hok-Yin | |
| D398,370 S * | 9/1998 | Purdy | D23/213 |
| D401,680 S | 11/1998 | Tiernan | |
| 5,865,378 A | 2/1999 | Hollinshead et al. | |
| D406,636 S | 3/1999 | Male et al. | |
| D413,157 S | 8/1999 | Ratzlaff | |
| 5,997,047 A | 12/1999 | Pimentel et al. | |
| 6,042,155 A | 3/2000 | Lockwood | |
| 6,095,801 A | 8/2000 | Spiewak | |
| D431,072 S | 9/2000 | Milrud et al. | |
| 6,164,569 A | 12/2000 | Hollinshead et al. | |
| 6,164,570 A | 12/2000 | Smeltzer | |
| 6,199,729 B1 | 3/2001 | Drzymkowski | |
| D440,641 S | 4/2001 | Hollinshead et al. | |
| 6,227,456 B1 | 5/2001 | Colman | |
| 6,276,004 B1 | 8/2001 | Bertrand et al. | |
| D450,370 S * | 11/2001 | Wales | D23/213 |
| 6,336,764 B1 * | 1/2002 | Liu | A46B 11/06 15/144.1 |
| 6,382,531 B1 | 5/2002 | Tracy | |
| 6,425,149 B1 | 7/2002 | Wang | |
| 6,450,425 B1 | 9/2002 | Chen | |
| 6,464,265 B1 | 10/2002 | Mikol | |
| D465,553 S | 11/2002 | Singtoroj | |
| 6,511,001 B1 | 1/2003 | Huang | |
| D470,219 S | 2/2003 | Schweitzer | |
| 6,537,455 B2 | 3/2003 | Farley | |
| 6,626,210 B2 | 9/2003 | Luettgen et al. | |
| 6,629,651 B1 | 10/2003 | Male et al. | |
| 6,643,862 B2 | 11/2003 | Aitken | |
| 6,659,117 B2 | 12/2003 | Gilmore | |
| 6,701,953 B2 | 3/2004 | Agosta | |
| D496,446 S | 9/2004 | Zwezdaryk | |
| 6,848,384 B2 | 2/2005 | Higgins | |
| D502,761 S | 3/2005 | Zieger et al. | |
| 6,863,227 B2 | 3/2005 | Wollenberg et al. | |
| 6,926,212 B1 | 8/2005 | Glass | |
| D517,669 S | 3/2006 | Zieger et al. | |
| D520,105 S | 5/2006 | Kosasih | |
| 7,066,411 B2 | 6/2006 | Male et al. | |
| 7,097,122 B1 | 8/2006 | Farley | |
| D529,151 S | 9/2006 | Macan et al. | |
| D531,259 S | 10/2006 | Hseih | |
| 7,147,172 B2 | 12/2006 | Darling, III et al. | |
| 7,201,331 B2 | 4/2007 | Bertrand | |
| 7,299,510 B2 | 11/2007 | Tsai | |
| D557,770 S | 12/2007 | Hoernig | |
| D559,953 S | 1/2008 | Bickler et al. | |
| 7,533,906 B2 | 5/2009 | Luettgen et al. | |
| 7,905,429 B2 | 3/2011 | Somerfield et al. | |
| 8,024,822 B2 | 9/2011 | Macan et al. | |
| 2002/0033424 A1 | 3/2002 | Rivera et al. | |
| 2002/0070292 A1 | 6/2002 | Hazenfield | |
| 2004/0163169 A1 | 8/2004 | Kollmann et al. | |
| 2005/0283904 A1 * | 12/2005 | Macan | E03C 1/0408 4/615 |
| 2006/0151632 A1 | 7/2006 | Larsen | |
| 2006/0208111 A1 | 9/2006 | Tracy et al. | |
| 2006/0231648 A1 | 10/2006 | Male et al. | |
| 2007/0251590 A1 | 11/2007 | Weinstein | |
| 2007/0272312 A1 | 11/2007 | Chang | |
| 2008/0083844 A1 | 4/2008 | Leber et al. | |
| 2008/0271240 A1 | 11/2008 | Leber et al. | |
| 2011/0139900 A1 | 6/2011 | Somerfield et al. | |

FOREIGN PATENT DOCUMENTS

| | | |
|---|---|---|
| CA | 2150317 | 11/1995 |
| DE | 352813 | 5/1922 |
| DE | 854100 | 10/1952 |
| DE | 2360534 | 6/1974 |
| DE | 2806093 | 8/1979 |
| DE | 3246327 | 12/1982 |
| DE | 4034695 | 5/1991 |
| DE | 4142198 | 4/1993 |
| DE | 19608085 | 3/1998 |
| EP | 0167063 | 6/1985 |
| EP | 0683354 | 11/1995 |
| EP | 0687851 | 12/1995 |
| EP | 0695907 | 2/1996 |
| EP | 0721082 | 7/1996 |
| FR | 538538 | 6/1922 |
| FR | 1098836 | 8/1955 |
| FR | 2596492 | 10/1987 |
| FR | 2695452 | 3/1994 |
| GB | 10086 | 5/1893 |
| GB | 3314 | 12/1914 |
| GB | 129812 | 7/1919 |
| GB | 204600 | 10/1923 |
| GB | 634483 | 3/1950 |
| GB | 971866 | 10/1964 |
| GB | 2156932 | 10/1985 |
| GB | 2298595 | 9/1996 |
| IT | 327400 | 7/1936 |
| IT | 350359 | 7/1937 |
| JP | S63-181459 | 11/1988 |
| JP | H2-78660 | 6/1990 |
| NL | 8902957 | 6/1991 |
| WO | WO93/12894 | 7/1993 |
| WO | WO93/25839 | 12/1993 |
| WO | WO96/23999 | 8/1996 |
| WO | WO98/30336 | 7/1998 |

OTHER PUBLICATIONS

"Showermaster 2" advertisement, Showermaster, P.O. Box 5311, Coeur d'Alene, ID 83814, as early as Jan. 1997.

* cited by examiner

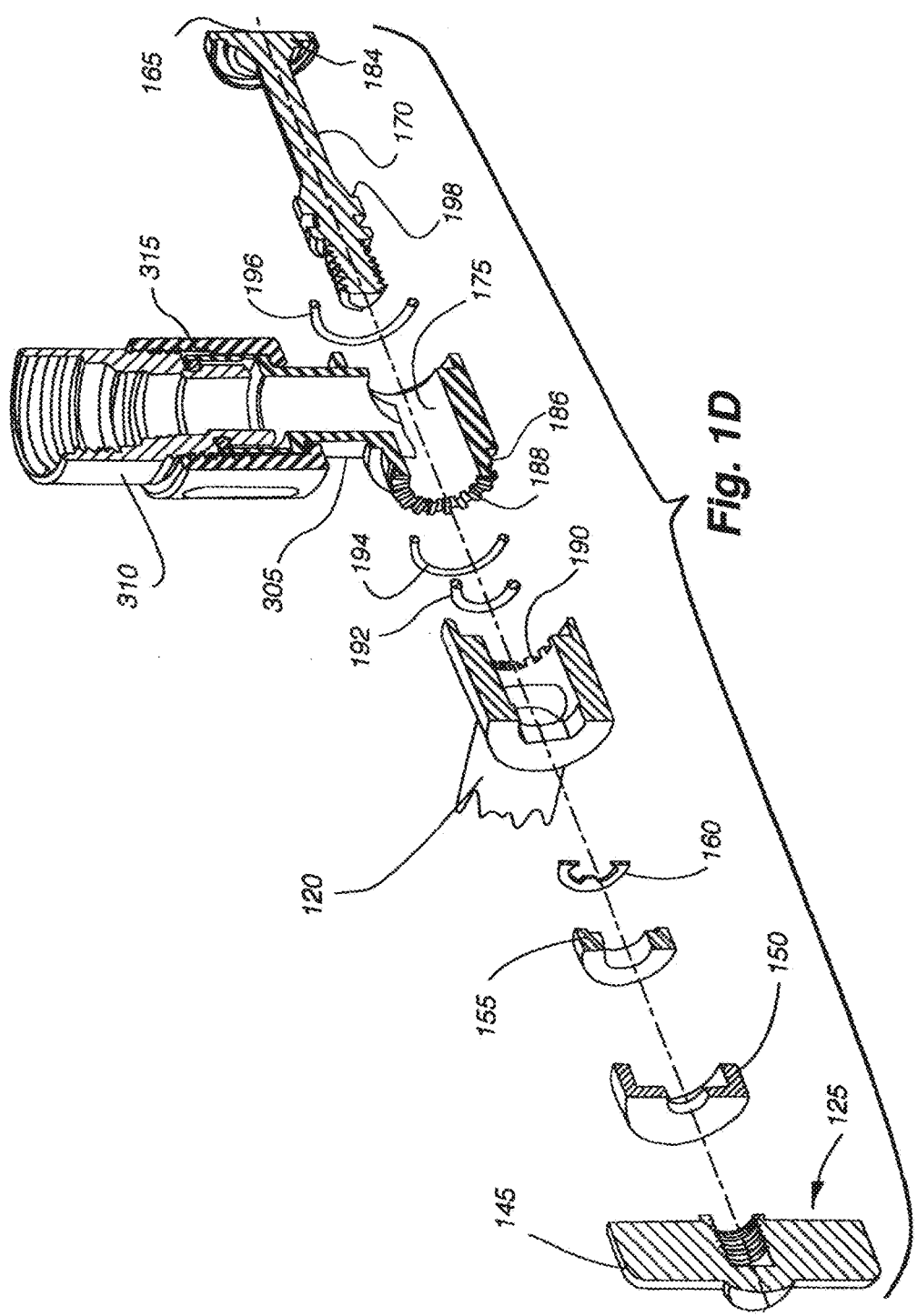

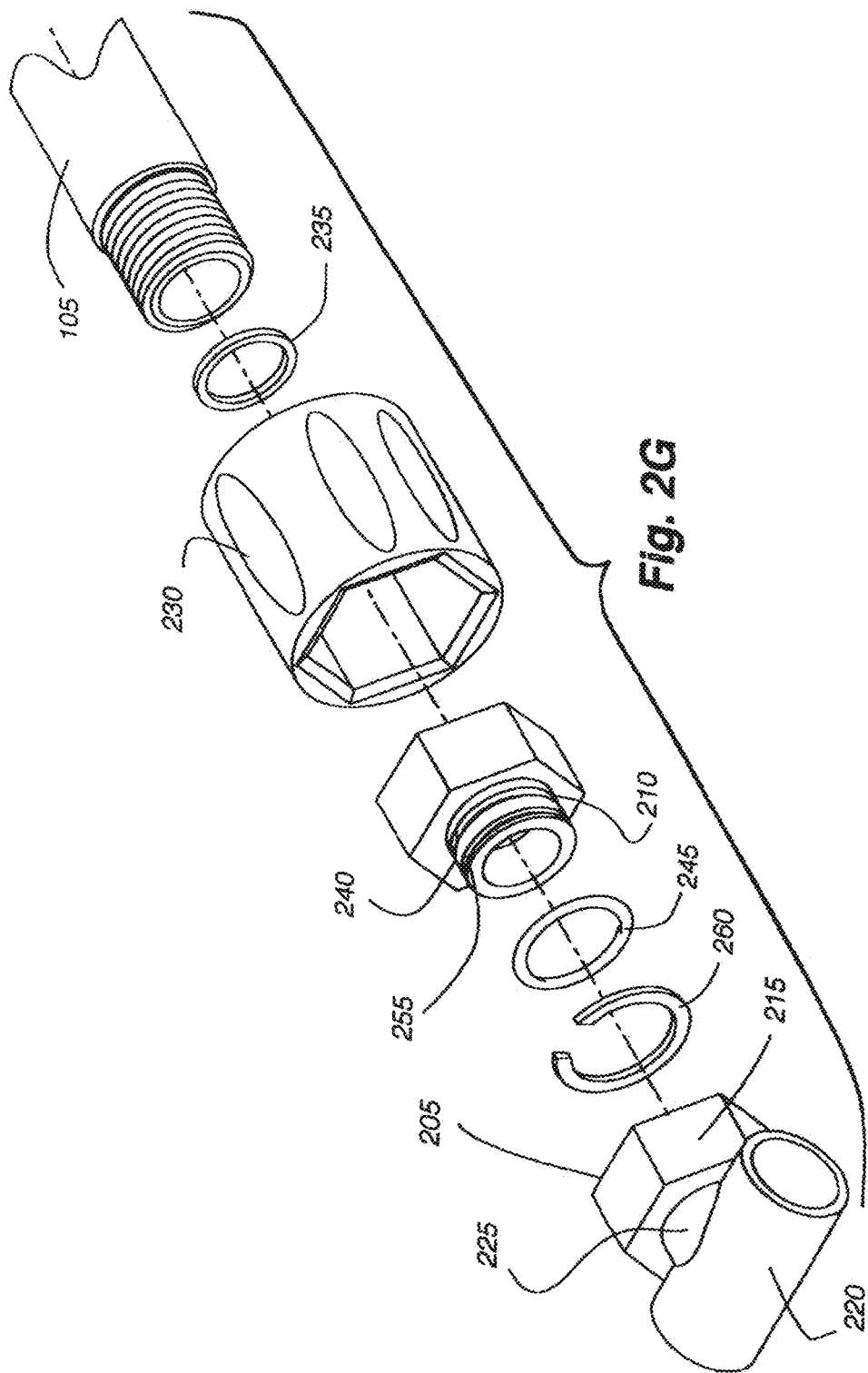

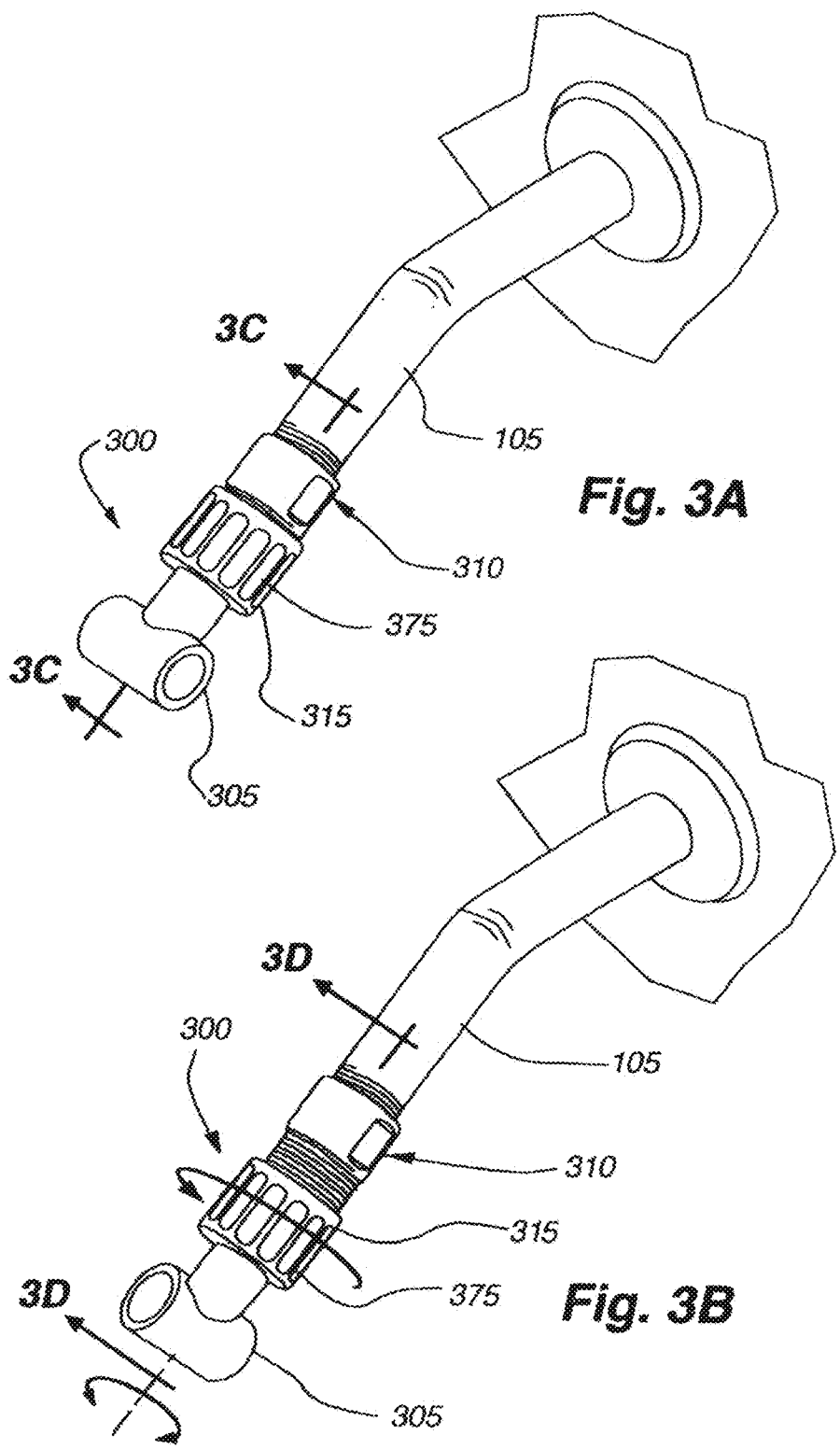

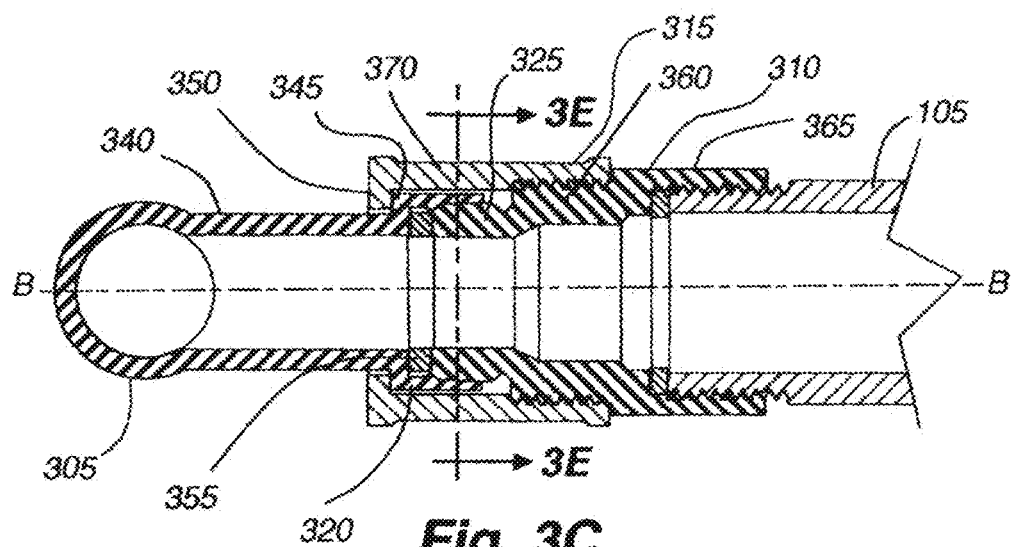
Fig. 3C
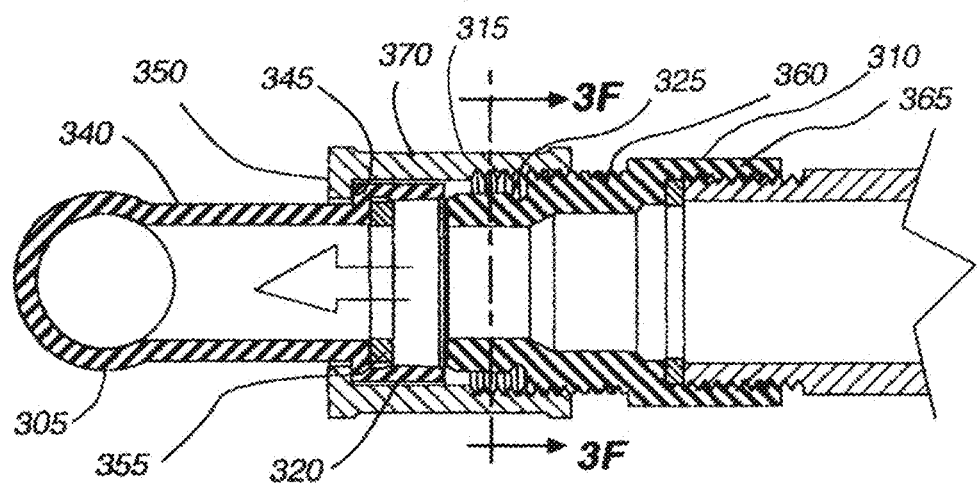
Fig. 3D
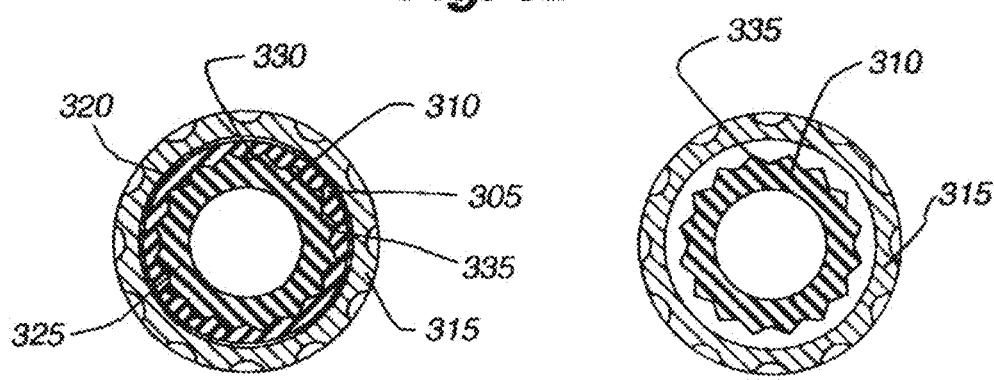
Fig. 3E
Fig. 3F

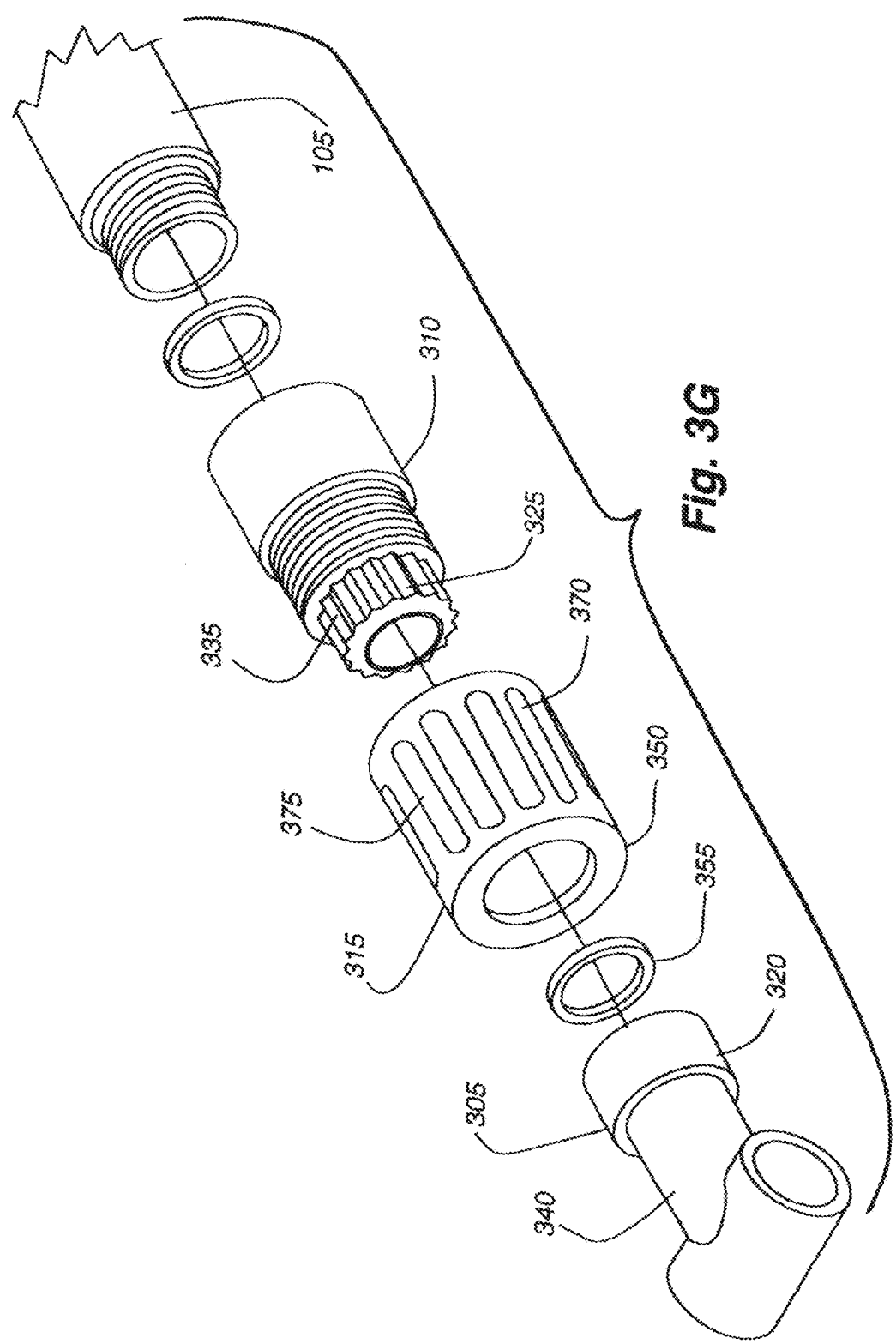

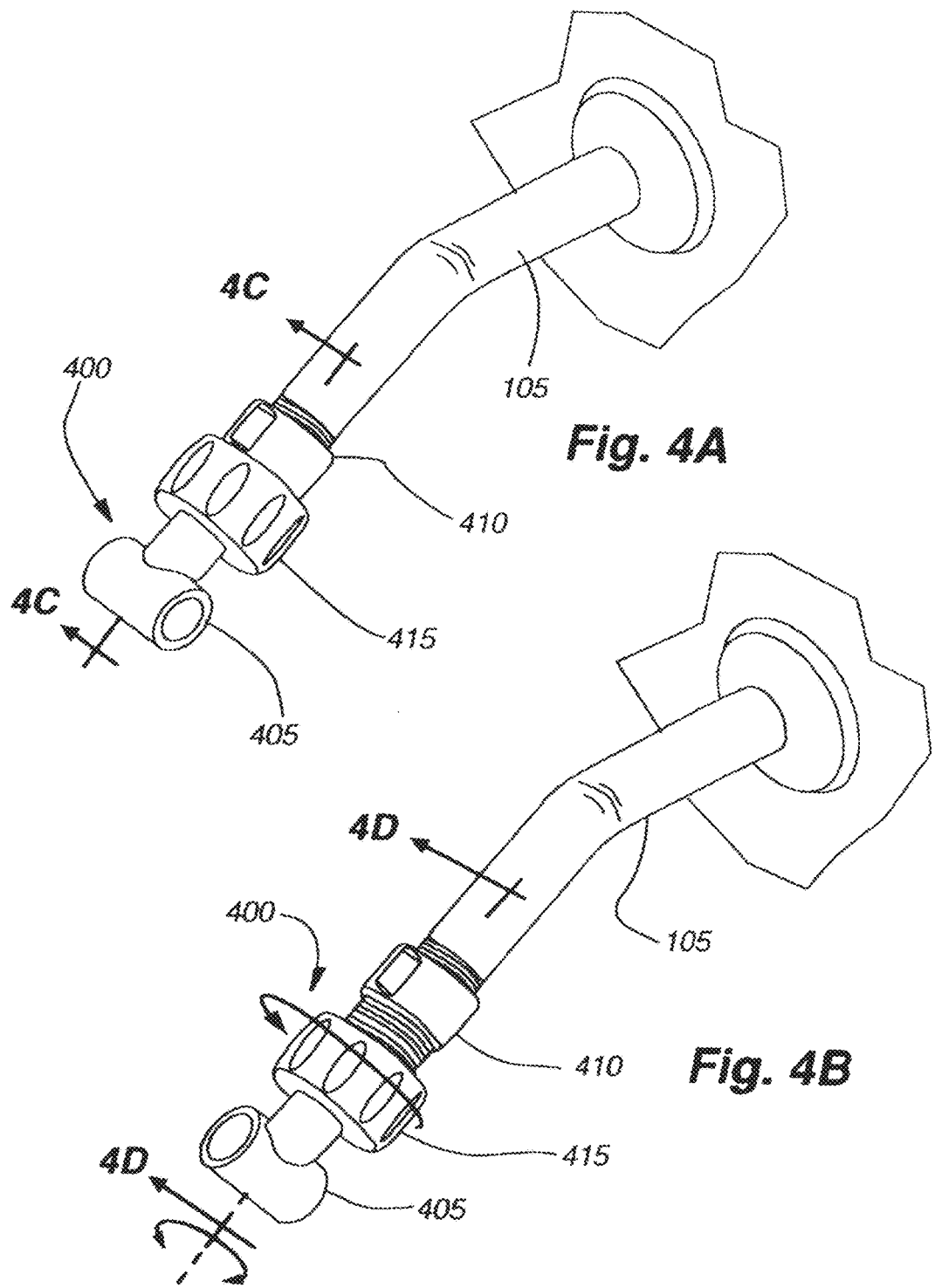

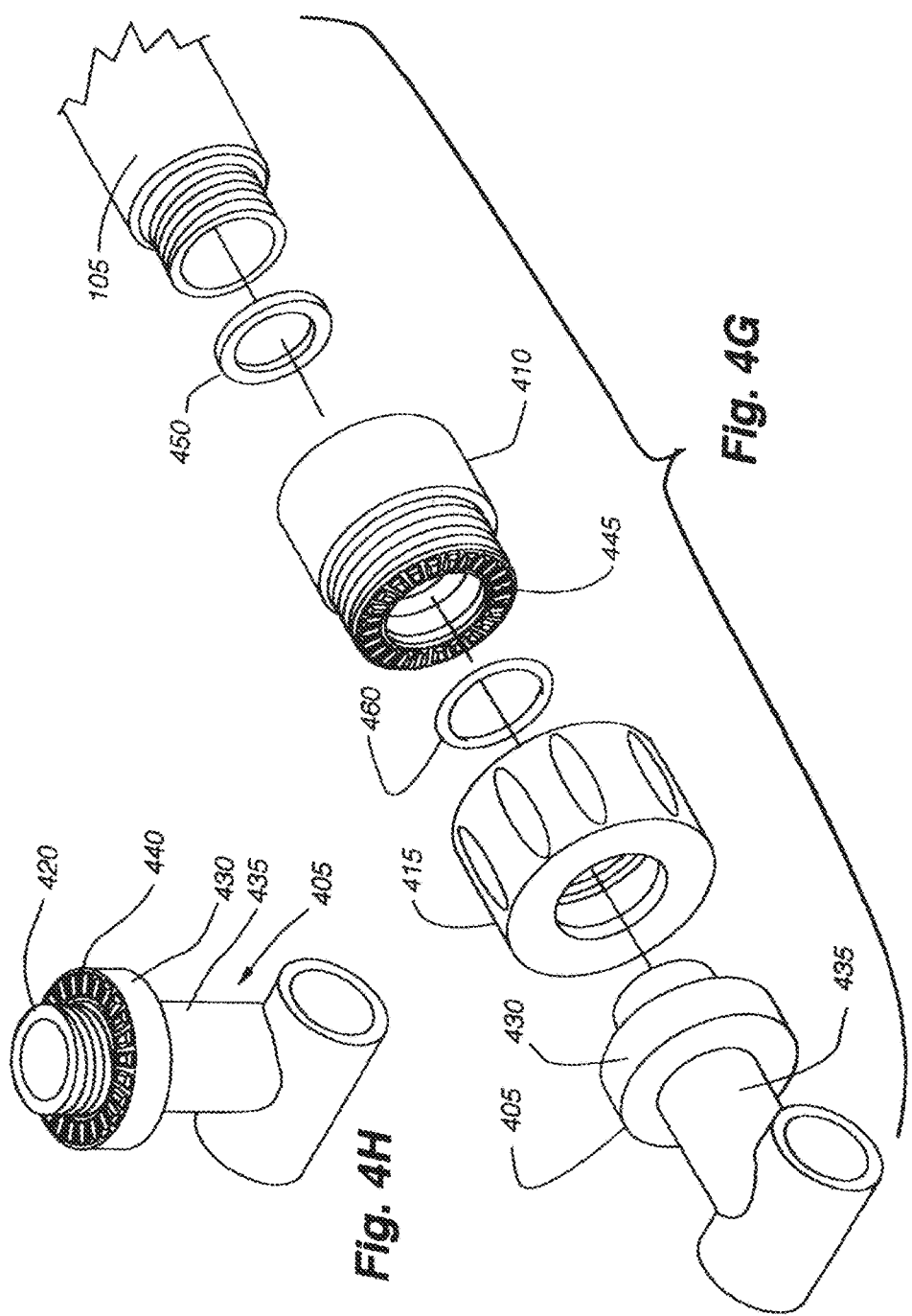

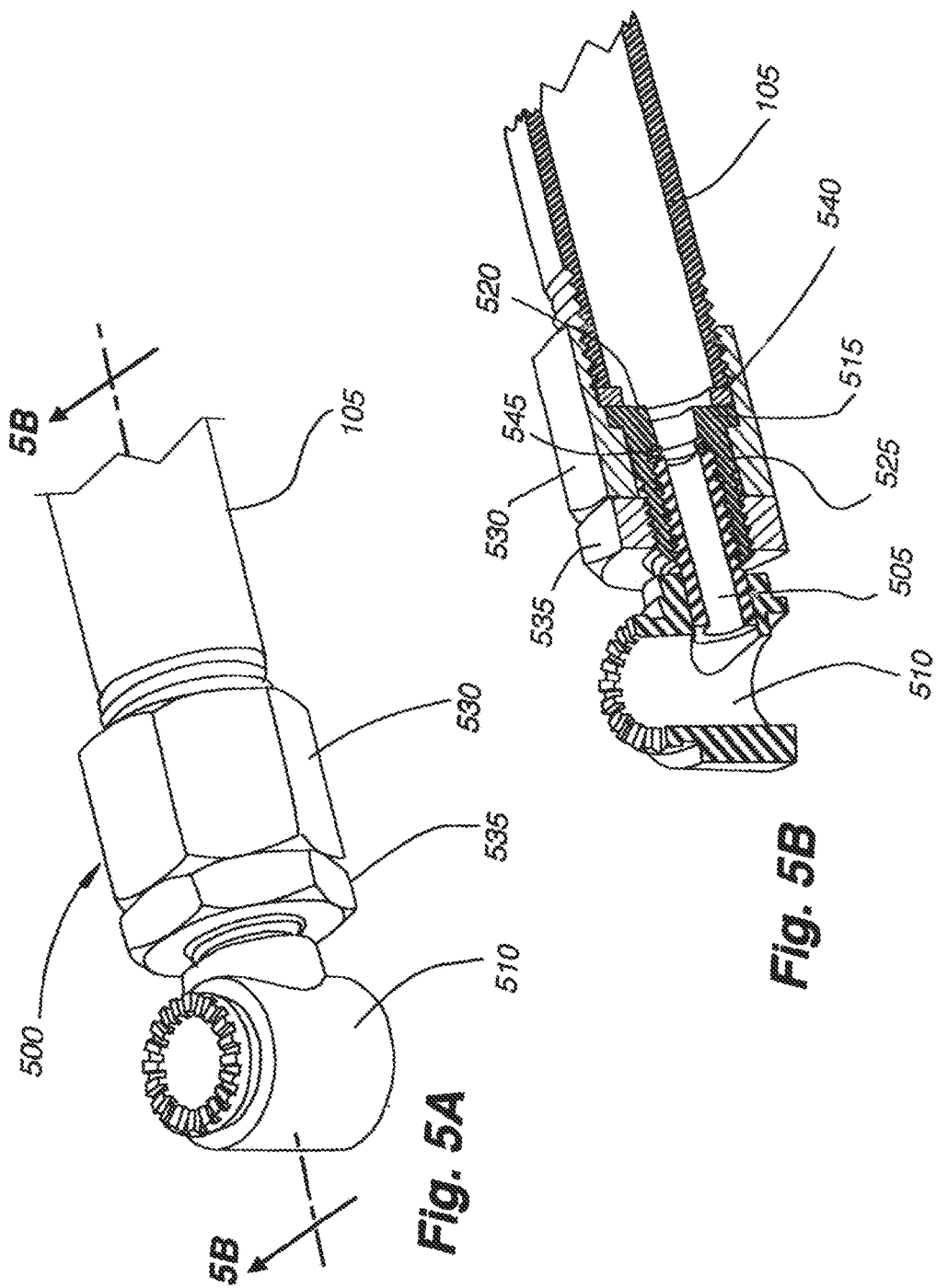

SHOWER ARM ATTACHMENT ASSEMBLY

CROSS-REFERENCE TO RELATED APPLICATIONS

This application is a continuation of U.S. patent application Ser. No. 14/470,120 filed on 27 Aug. 2014 entitled "Showerhead attachment assembly," which is a divisional of U.S. patent application Ser. No. 11/869,183 filed on 9 Oct. 2007 entitled "Showerhead attachment assembly," which claims priority pursuant to 35 U.S.C. § 119(e) to U.S. Provisional Application No. 60/828,741 filed on 9 Oct. 2006 entitled "Showerhead attachment assembly," the disclosures of which are each hereby incorporated by reference herein in their entireties.

TECHNICAL FIELD

The disclosure generally relates to showerheads, and more particularly to showerhead connections.

BACKGROUND

To locate a showerhead overhead rather than at the side of a shower stall, the showerhead may be attached to the end of an arm, which in turn may be attached to a water outlet pipe of the shower stall. For positioning a standard overhead showerhead at a desired vertical location and the showerhead face at a desired orientation relative to arm's longitudinal axis, the arm may be fitted with one or more joints formed from an assembly of parts to pivot the arm relative to the water outlet and the showerhead relative to the arm. Undesired vertical movement of the standard overhead showerhead relative to the water outlet pipe is generally prevented using a friction mechanism such as winged nut to adjust the friction between pivoting parts in the joint.

Generally, standard overhead shower arm assemblies that utilize friction mechanisms for vertical adjustment of the showerhead via pivoting the arm relative to the water outlet may minimize undesired vertical movement of the showerhead relative to the water outlet pipe for light showerheads, thus maintaining such a light showerhead in the desired position. However, these standard shower arm assemblies often to fail to maintain the vertical position of a relatively large or heavy showerhead or a showerhead constructed of a denser material, such as a metal. Thus, standard shower arms using standard friction mechanisms to prevent vertical showerhead movement are unsuitable for many modern applications.

Adjusting the position of the showerhead under water pressure can also be problematic. Specifically, when the friction mechanisms are adjusted to permit positioning of the showerhead, water often leaks through the loosened joints. Additionally, a user can inadvertently disassemble the standard overhead showerhead arm assembly by unscrewing the typical winged nut friction mechanism too far, and thus possibly injure the user and/or have small components of the arm assembly fall into the shower's drain.

Yet another issue with a typical overhead shower arm assembly involves the coupling members or assemblies used to attach the shower arm to the shower pipe. Often, the coupling members or assemblies permit relatively little or limited rotational adjustment of the arm around the shower pipe's longitudinal axis before the water-tightness between the shower pipe and the coupling member is compromised.

SUMMARY

One embodiment of a shower arm attachment assembly may include a first member, a second member, and a locking member, such as a sleeve or locking nut. The first member may be in fluid communication with a showerhead. The second member may be attachable to a shower pipe. The second member may be selectively rotatably joined to the first member. The locking member may be selectively engageable with a joinder between the first and second member. When engaged, the sleeve may substantially prevent rotation of the first member relative to the second member.

Another embodiment of a shower arm attachment assembly may include a first member, a second member, and a third member. The first member may be in fluid communication with a showerhead and may include a first keying feature. The second member may be attachable to a shower pipe and may include a second keying feature for engagement with the first keying feature to substantially prevent rotation of the second member relative to the first member. The third member may be selectively engageable with the first member and the second member. When engaged, the third member may join the first member with the second member and may engage the first keying feature with the second keying feature.

Yet another embodiment of a shower arm attachment assembly may include a first member, a second member, a third member and a fourth member. The first member may be in fluid communication with a showerhead. The second member may be joined to the first member and may be rotatable relative to the first member. The third member may fluidly join the second member to a shower pipe water outlet. The fourth member may be selectively engageable with the second member. When engaged, the fourth member may substantially prevent rotation of the first member relative to the second member.

Still yet another embodiment of a shower arm assembly may include an arm, a shower arm attachment assembly, and an arm rotation assembly. The shower arm attachment assembly may include an arm coupling member. The arm rotation assembly may include a connector rod, a nut, and a retaining clip. The nut may be joined to the connector rod and may be operative with the connector rod to press together the arm coupling member and the arm. The retaining clip may be attached to the connector rod and may operative with the connector rod to prevent disassembly of the arm from the arm coupling member.

Yet another embodiment of a shower arm assembly may include an arm, a shower arm attachment assembly, and an arm rotation assembly. The arm may include a first keying feature. The shower arm attachment assembly may include an arm coupling member with a second keying feature for engagement with the first keying feature to substantially prevent rotation of the arm relative to the arm coupling member. The arm rotation assembly may include a connector rod, a nut, and a connector rod. The nut may be joined to the connector rod and may be operative with the connector rod to press together the arm coupling member and the arm to engage the first keying feature with the second keying feature.

BRIEF DESCRIPTION OF THE DRAWINGS

FIG. 1D depicts a partially exploded, cross-sectional perspective view of the shower arm assembly of FIG. 1A.

FIG. 2G depicts an exploded perspective view of the shower arm attachment assembly of FIG. 2A.

FIG. 3A depicts a top perspective view of a second embodiment of a shower arm attachment assembly showing a locking nut in a first position.

FIG. 3B depicts another top perspective view of the shower arm attachment assembly of FIG. 3A, showing the locking nut in a second position.

FIG. 3C depicts a cross-sectional view of the shower arm attachment assembly of FIG. 3A, viewed along line 3C-3C in FIG. 3A.

FIG. 3D depicts a cross-sectional view of the shower arm attachment assembly of FIG. 3A, viewed along line 3D-3D in FIG. 3B.

FIG. 3E depicts a cross-sectional view of the shower arm attachment assembly of FIG. 3A, viewed along line 3E-3E in FIG. 3C.

FIG. 3F depicts a cross-sectional view of the shower arm attachment assembly of FIG. 3A, viewed along line 3F-3F in FIG. 3D.

FIG. 3G depicts an exploded perspective view of the shower arm attachment assembly of FIG. 3A.

FIG. 4A depicts a top perspective view of a shower arm attachment assembly, showing a locking nut in a first position.

FIG. 4B depicts another top perspective view of the shower arm attachment assembly of FIG. 4A, showing the locking nut in a second position.

FIG. 4G depicts an exploded perspective view of the shower arm attachment assembly of FIG. 4A.

FIG. 4H depicts a perspective view of a arm coupling member for the shower arm attachment assembly of FIG. 4A.

FIG. 5A depicts a top perspective view of a fourth embodiment of a shower arm attachment assembly.

FIG. 5B depicts a cross-sectional view of the shower arm attachment assembly of FIG. 5A, viewed along line 5B-5B in FIG. 5A.

DETAILED DESCRIPTION

One embodiment of a shower arm attachment assembly may include an arm coupling member in fluid communication with a shower pipe coupling member. The arm coupling member may also be in fluid communication with a showerhead, and the shower pipe coupling member may also be in fluid communication with a shower pipe as well as, in some embodiments, attached directly to the shower pipe. In some embodiments, the arm coupling member and the shower pipe coupling member may be joined together using a snap ring, collar, or other suitable device to allow selective rotation of the arm coupling member relative to the shower pipe coupling member. In such embodiments, a sleeve, nut, or the like may be selectively engageable with the arm coupling member and the shower pipe coupling member to selectively prevent rotation of the arm coupling member relative to the shower pipe coupling member.

In another embodiment of the shower arm attachment assembly, the arm coupling member and the shower pipe coupling member may be joined together in select relative rotational positions to each other using a keying feature. The keying feature may also substantially prevent rotation of the arm coupling member relative to the shower pipe coupling member when the coupling members are joined together. In some embodiments, the keying feature may have a first portion on one of the arm and shower pipe coupling members, and a second, complementary portion on the other coupling member. In some of these embodiments, the first portion may take the form of a shaft with projections that engage grooves formed on the second complementary portion of the other member, which may receive the shaft. In other of these embodiments, the first and second portions may take the form of engaging projections on abutting surfaces of each member. A threaded sleeve, a nut or the like may join the arm coupling member with the shower pipe coupling member.

In yet another embodiment of a shower arm attachment assembly and as shown in FIGS. 5A and 5B, a shower arm cross member may be joined to a threaded stud, which in turn is joined to a threaded tee. The threaded stud may be selectively rotatable relative to the threaded stud. The threaded tee may be joined to the shower pipe with a shower pipe nut. A jam nut may be threadedly received on the threaded tee to substantially prevent selective rotation of the threaded stud relative to the threaded tee. The various embodiments of showerhead attachment assemblies may be used to fluidly join showerheads to shower pipes.

Figure 1A:
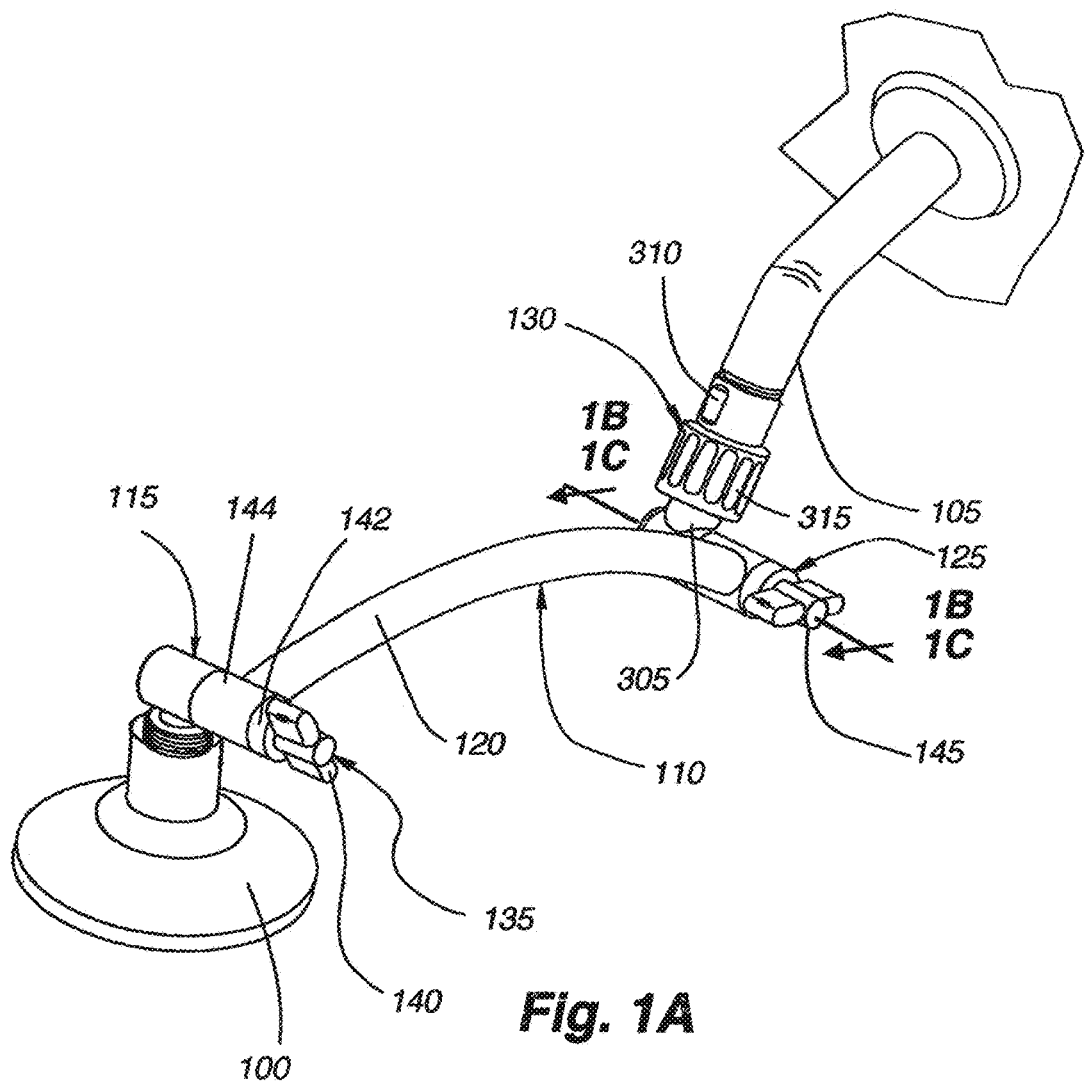
FIG. 1A depicts a top perspective view of a shower arm assembly connected to a shower pipe.

FIG. 1A depicts a showerhead 100 joined to a shower pipe 105 by an arm assembly 110. The arm assembly 110 may include a showerhead attachment member 115, an arm 120, an arm rotation assembly 125, a shower arm attachment assembly 130, and a showerhead rotation assembly 135. As described in more detail below in connection with various embodiments of the shower arm attachment assembly 130, the shower arm attachment assembly mechanically 130 and fluidly joins the arm 120 to the shower pipe 105. In some embodiments, such as those depicted in FIGS. 1A and 3A, the shower arm attachment assembly 130 may include an arm coupling member 305 joined to a shower pipe coupling member 310 using a locking nut 315.

The showerhead rotation assembly 135 may be used to adjust of the angle of the showerhead's face relative to the arm's longitudinal axis. The showerhead rotation assembly 135 may include a showerhead rotation nut 140, which may be selectively tightened or loosened to increase or decrease the friction between the showerhead attachment member 115 and the arm 120. The showerhead rotation nut 140 may be winged to provide a gripping feature for a user to grasp when tightening or loosening the nut 140. As the friction is increased or decreased, the ability to rotate the showerhead attachment member 115 relative to the arm 120 around the showerhead rotation assembly's longitudinal axis decreases or increases, respectively.

The arm rotation assembly 125 adjusts and maintains the vertical position of the showerhead 100 relative to the shower pipe 105. More particularly, the arm rotation assembly 125 may include an arm rotation nut 145, which may be selectively tightened or loosened to prevent or allow the arm 120 to pivot relative to the shower arm attachment assembly 130 by rotating the arm 120 around the arm rotation assembly's longitudinal axis as described in more detail below. As the arm 120 is pivoted relative to the shower arm attachment assembly 130, the vertical position of the showerhead 100 relative to the shower pipe 105 changes. Like the showerhead rotation nut 140, the arm rotation nut 145 may be winged to facilitate tightening or loosening of the nut 140 by a user.

Figure 1B:
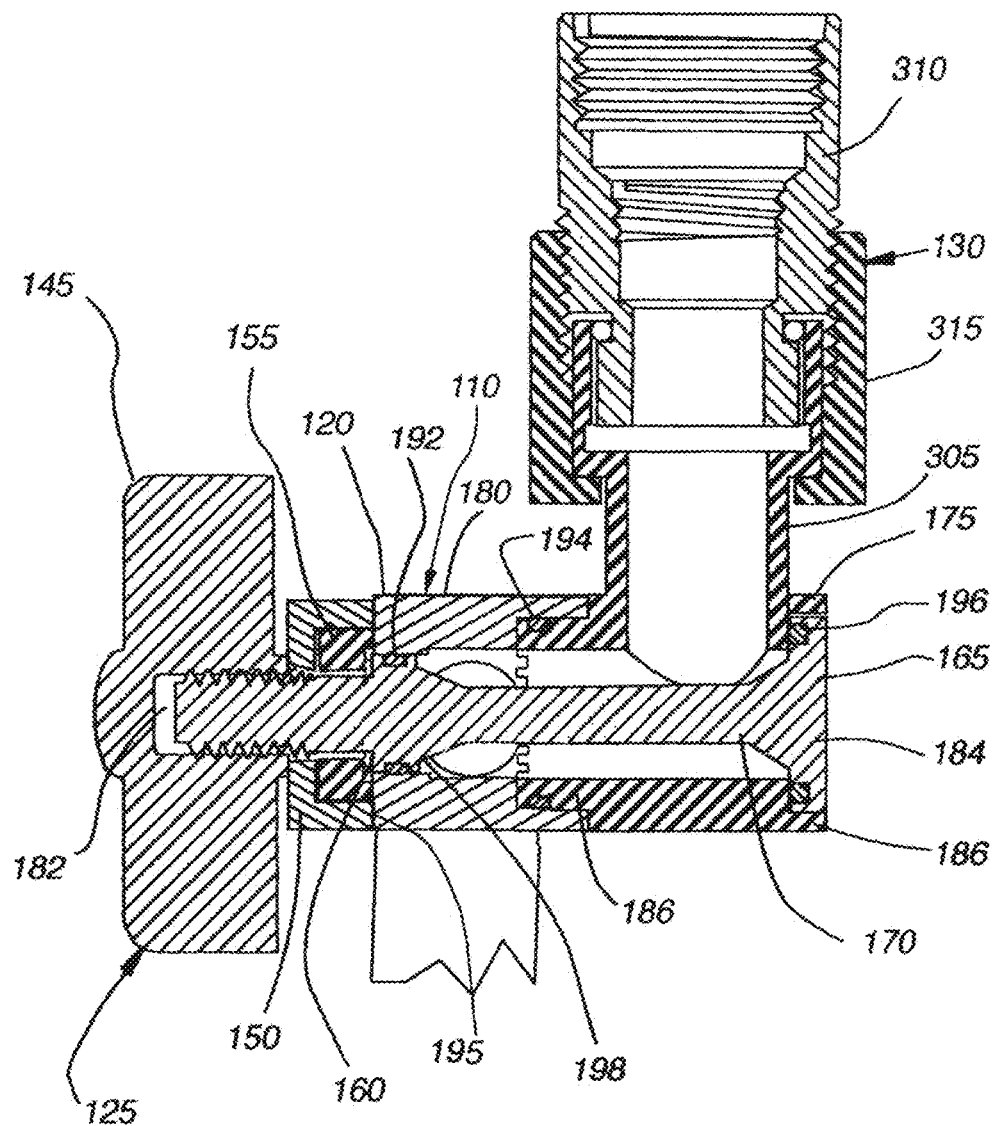
FIG. 1B depicts a cross-sectional view of the shower arm assembly of FIG. 1A viewed along line 1B-1B in FIG. 1A, showing an arm rotation nut configured in its tightened position.

FIG. 1B depicts a cross-sectional view of the arm assembly 100 depicted in FIG. 1A viewed along line 1B-1B with the arm rotation nut 145 in a tightened configuration to substantially prevent rotation of the arm 120 relative to the shower arm attachment assembly 130. FIG. 10 is a cross-sectional view similar to the one shown in FIG. 1B except the arm rotation nut 145 is positioned in a loosened configuration to allow rotation of the arm 120 relative to the arm attachment assembly 130.

The arm rotation assembly 125 may include the arm rotation nut 145, a sleeve 150, a sleeve washer 155, an E-ring 160, and a connector rod 165. Together, the sleeve 150 and the connector rod 165 press together the arm 120 and an arm coupling member 305 as the rotation nut 145 is tightened. More particularly, the connector rod 165 includes a rod shaft 170. The rod shaft 170 extends through a hollow arm connection portion 175 of the 305, a tube section 180 of the arm 120, a hole in the sleeve washer 155, and a hole in the sleeve 150. A threaded hole 182 formed in the arm rotation nut 145 receives a threaded end portion of the rod shaft 165. An opposite end of the rod shaft 165 includes a circular rod end flange 184. A collar segment 186 of the arm coupling member 305 receives the rod end flange 184.

As the rotation nut 145 is tightened by threading the connector rod 165 into the threaded hole 182, the rotation nut 145 bears against the sleeve 150, which in turn bears against the arm 120. The rotation nut 145 also pulls the connector rod 165 towards the rotation nut 145 as it is tightened, which causes the rod end flange 184 of the connector rod 165 to bear against the arm coupling member 305. The sleeve 150 bearing against the arm 120 combined with the connector rod 165 bearing against the arm coupling member 305 presses together the arm 120 and the arm coupling member 305.

When pressed together, rotation of the arm 120 relative to the arm coupling member 305 around the longitudinal axis of the connector rod 165 is prevented by a keying feature associated with either or both of the arm coupling member 305 and the arm 120. More particularly, the arm's tube section 180 receives a splined segment 186 of the arm coupling member 305. As shown in FIG. 1D, an end of the splined segment 186 includes multiple splines 188. When the arm coupling member 305 and the arm 120 are pressed together, these splines 188 engage matching grooves defined by multiple splines 190 (see FIG. 1D) formed on the interior surface of the tube section 180 abutting the splined end of the arm coupling member 305. When engaged, rotation of the arm coupling member 305 relative to the arm 120 is prevented by this interconnection of the splines 188, 190.

In some embodiments, matching splines are formed along the longitudinal abutting surfaces of the arm coupling member's splined segment 186 and the arm tube section 180 in lieu of, or in combination with, the splines 188, 190. In yet other embodiments, the end of the splined segment 186 and the interior surface of the tube section 180 proximate this end may define square, hexagonal, oval or other suitable shapes that restrict or otherwise limit rotation of the arm coupling member 305 relative to the arm 120 when pressed together.

To disengage the splines 188, 190, a user loosens the rotation nut 145 by unthreading it from the connector rod 165. When sufficiently loosened, the user may pull apart the arm 120 and the arm coupling member 305 sufficiently to disengage each components' respective splines 188, 190. Once disengaged, the user may rotate the arm 120 relative to the arm coupling member 305 around the connector rod 165 to adjust the vertical position of the showerhead 100 relative to the shower pipe 105.

As shown in FIGS. 1B and 10, an E-ring 160 or other suitable retaining element, such as a C-ring, is joined to the connector rod 165 between an arm end wall 195 and the threads on the connector rod 165 to limit the amount of separation between the arm 120 and the arm coupling member 305. Specifically, as the arm 120 and the arm coupling member 305 are separated, the arm end wall 195 pushes the E-ring 160 against the threads on the connector rod 165, which prevents further movement of the arm 120 away from the arm coupling member 305. The amount of permitted separation is a function of the distance between the circular rod flange 184 and the connector rod threads compared to the length of the joined arm tube section 180 and the arm coupling member connection portion 175 along the longitudinal axis of the connector rod 165. This permitted separation distance is selected to allow a user to at least sufficiently separate the arm 120 and the arm coupling member 305 to disengage their respective splines 188, 190.

Positioning the E-ring 160 on the connector rod 165 as described above also prevents a user from inadvertently disassembling of the connector rod 165, the arm 120, and the arm coupling member 305 when unthreading the arm rotation nut 145 from the connector rod 165. More particularly, if a user unthreads the arm rotation nut 145 too much, only the arm rotation nut 145, the sleeve 150 and the sleeve washer 155 may become disconnected from the arm assembly 110. The arm 120, the connector rod 165, and the arm coupling member 305 will remain joined together, even under water pressure, by the E-ring 160 because the E-ring limits the amount of separation between the arm 120 and the arm coupling member 305 and keeps the connector rod 165 joined to these two components. This, in turn, limits the potential for a user to be injured by an inadvertent disassembly of these components.

The E-ring 160 also allows for a user to vertically position the showerhead 100 relative to the shower pipe 105 under water pressure without water leaking out of the arm assembly 110. More particularly, the maximum amount of separation between the arm 120 and the arm coupling member 305 permitted by the E-ring 160 is selected so that various O-rings 192, 194, 196 strategically positioned between the connector rod 165, the arm 120, and the arm coupling member 305 as shown for example in FIGS. 1B and 1O maintain water-tight seals between these various components at the joints formed by them. Thus under water pressure, the rotation nut 145 may be loosened to permit the arm 120 and arm coupling member 305 to be separated for vertical positioning of the showerhead 100 without water leaking through the various joints formed by the arm 120, the rod connector 165 and the arm coupling member 305 because the O-rings 192, 194, 196 continue to maintain the water seals between these components at the maximum amount of separation between the arm 120 and the arm coupling member 305.

The connector rod 165 may include a generally cylindrical intermediate rod flange 198 located between the connector rod threads and the rod end flange 184. A generally circular hole in the arm end wall 195 receives the intermediate rod flange 198. At least a portion of the cross-sections of the intermediate wall flange 198 and the end wall hole may be shaped to substantially prevent rotation of the connector rod 165 relative to the arm 120 around the connecter rod's longitudinal axis. For example, at least a portion of the cross-sections of the intermediate rod flange 198 and the end wall hole may be oval shaped as shown in FIG. 1D. In other embodiments, cross-sectional portions of the intermediate wall flange 198 and the end wall hole may be square, hexagonal or any other suitable shape to substantially prevent rotation of the connector rod 165 relative to the arm 120.

Figure 1C:
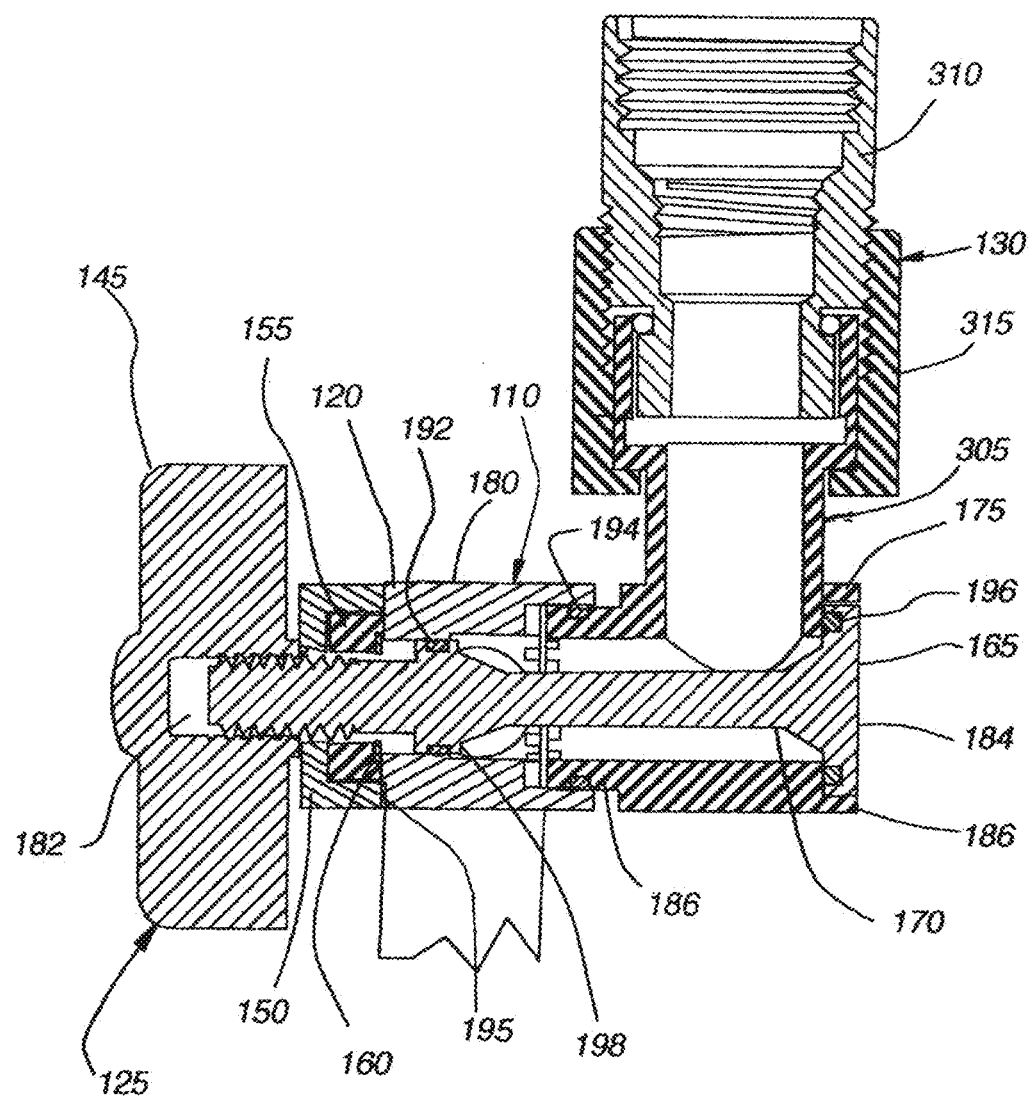
FIG. 1C depicts a cross-sectional view of the shower arm assembly of FIG. 1a viewed along line 1B-1B in FIG. 1A, showing the arm rotation nut configured in its loosened position.

With continued references to FIGS. 1B-1D, a groove formed in the intermediate rod flange 198 receives an O-ring 192 to seal the joint formed between the arm 120 and the connector rod 165. A groove formed in the arm coupling member's splined segment 186 receives an O-ring 194 to seal the joint formed between the arm 120 and the arm coupling member 305. A groove formed in the rod end flange 184 receives an O-ring 196 to seal the joint formed between the arm coupling member 305 and the rod connector 165. These seals each prevent leakage of water through the associated joints formed by the arm 120, the connector rod 165, and the arm coupling member 305. Any of the grooves for receiving the O-rings 192, 194, 196 may be formed in the other component forming the joint sealed by these O-rings 192, 194, 196 rather the component depicted in FIGS. 1B and 1O, or may be formed in both components.

Returning to FIG. 1A, the showerhead rotational assembly 135 may be similar to the arm rotational assembly 125 and may operate in a similar manner. More particularly, the arm rotational assembly 125 may include a showerhead rotation nut 140, a sleeve 142, a connector rod (not shown), a sleeve washer (not shown), and an E-ring (not shown). In a manner similar to the arm rotational assembly 125, the showerhead rotation nut 140, the sleeve 142 and the connector rod (not shown) may press together the showerhead attachment member 115 and a second arm tube section 144 to substantially prevent rotation of the showerhead attachment member 115 relative to the arm 120 when the showerhead rotation nut 140 is tightened. Likewise, loosening the showerhead rotation nut 140 allows a user to rotate the showerhead attachment member 115 relative to the arm 120. Also similar to the arm rotation assembly 125, the E-ring or other suitable retaining device (not shown) may be joined to the connector rod (not shown) to limit the maximum distance that the showerhead attachment 115 and the arm 120 can be pulled apart.

Figure 2A:
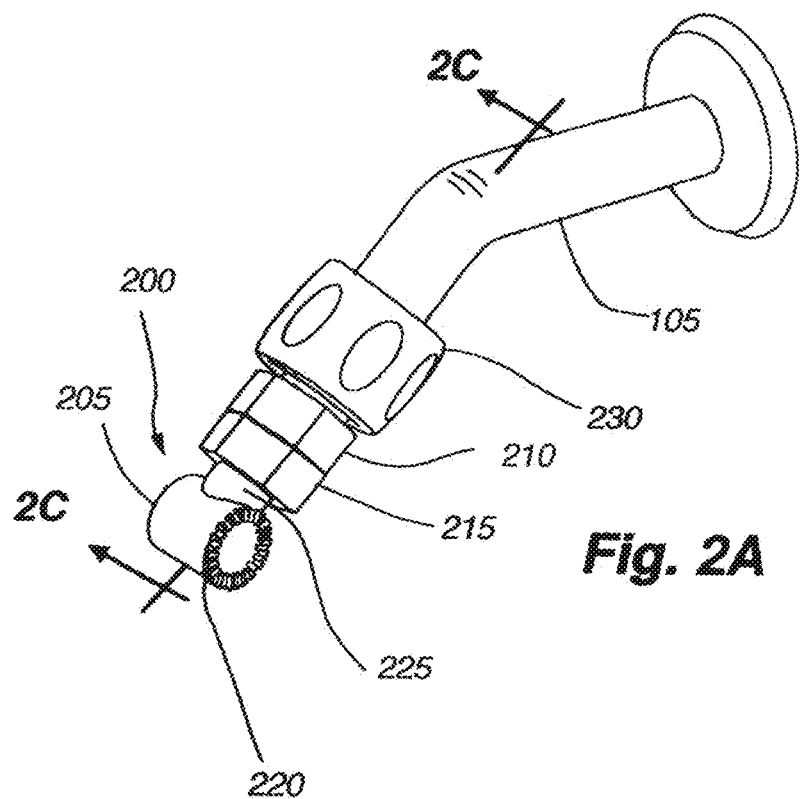
FIG. 2A depicts a top perspective view of a first embodiment of a shower arm attachment assembly showing a locking sleeve in a first position.
Figure 2B:
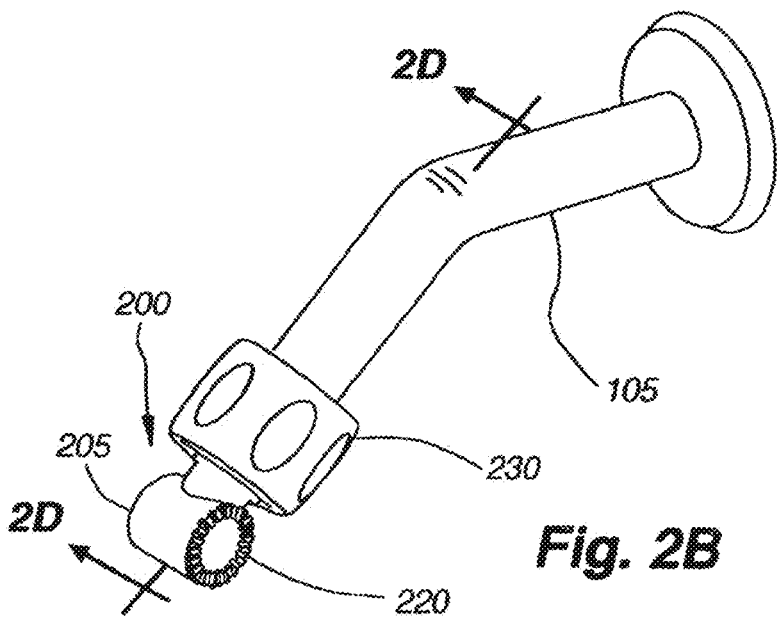
FIG. 2B depicts another top perspective view of the shower arm attachment assembly of FIG. 2A, showing the locking sleeve in a second position.

A first embodiment of a shower arm attachment assembly 200 is depicted in FIGS. 2A-2G. This shower arm attachment assembly 200 may be used with the arm assembly 110 shown in FIG. 1A. With reference to FIGS. 2A and 2B, the shower arm attachment assembly 200 may include an arm coupling member 205 joined to a shower pipe coupling member 210. The shower pipe coupling member 210, in turn, may be joined to a shower pipe 105. The shower pipe 105 delivers water to the shower arm coupling assembly 200, and ultimately to an attached showerhead 100 (see FIG. 1), from a water heater, a water reservoir, or other suitable water source (not shown).

The arm coupling member 205 may include a shower pipe connection portion 215 for joining the arm coupling member 205 to the shower pipe coupling member 210. When joined, the arm coupling member 205 may be rotated relative to the shower pipe coupling member 210 as described in more detail below. The arm coupling member 205 may also have an arm connection portion 220 for joining the arm coupling member 205 to a showerhead arm (not shown) fluidly joined to a showerhead (not shown). The arm connection portion 220 may be joined to its shower pipe connection portion 215 by an intermediate portion 225. The shower pipe connection portion 215, arm connection portion 220, and the intermediate portion 225 may be integrally formed, or may be separate elements joined together by adhesives, heat or sonic welds, mechanical fasteners, any other suitable means for joining elements together, or any combination thereof.

An outer surface of the arm coupling member's shower pipe connection portion 215 may define multiple flat surfaces. The shower pipe connection portion 215 may be, for example, square or hexagonal in cross-section. These surfaces may generally correspond to matching substantially flat surfaces defined by an outer surface of the shower pipe coupling member 210, which may have a cross-section matching that of the shower pipe connection portion 215. When these surfaces for the shower pipe coupling member 210 and the arm coupling member 205 are generally aligned as shown in FIG. 2A, a locking sleeve 230 or other suitable device may be moved over the arm and shower pipe coupling members 205, 210 as shown in FIG. 2B. As described in more detail below, because the cross-section of the locking sleeve's interior generally correlates to the outer surfaces of the arm and shower pipe coupling members 205, 210 (see, e.g., FIGS. 2E and 2F), positioning the locking sleeve 230 over the arm and shower pipe coupling members 205, 210 typically prevents rotation of the shower pipe coupling member 210 relative to the arm coupling member 205 around the longitudinal axis marked as A-A on FIG. 2C.

Figure 2C:
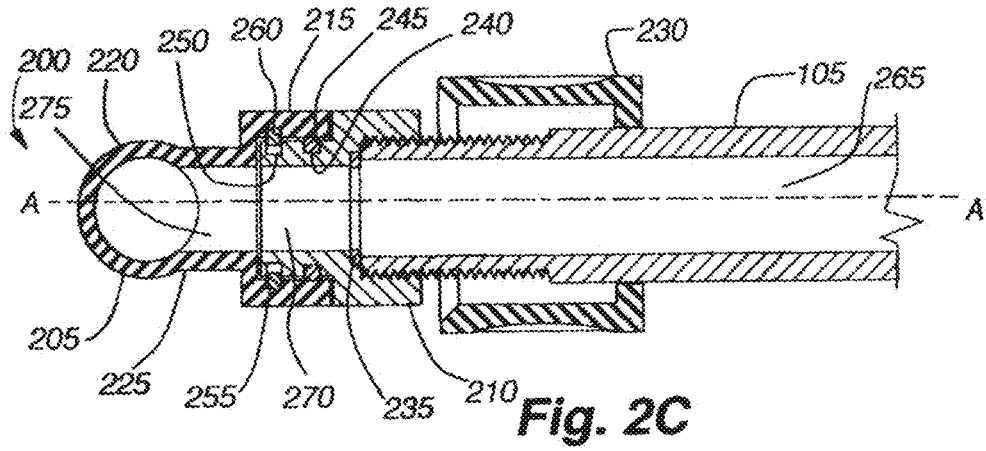
FIG. 2C depicts a cross-sectional view of the shower arm attachment assembly of FIG. 2A, viewed along line 2C-2C in FIG. 2A.
Figure 2D:
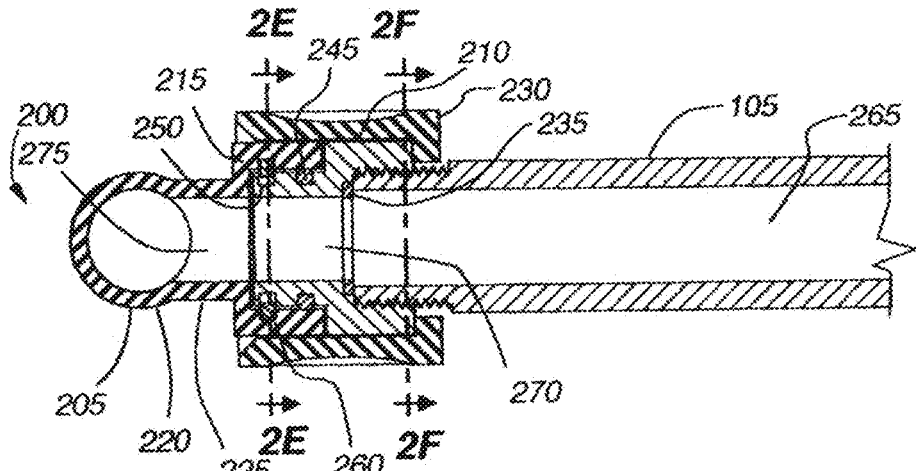
FIG. 2D depicts a cross-sectional view of the shower arm attachment assembly of FIG. 2A, viewed along line 2D-2D in FIG. 2B.

Turning to the cross-section views of FIGS. 2C (which shows the locking sleeve 230 in its unlocked position) and 2D (which shows the locking sleeve 230 in its locked position), the shower pipe coupling member 210 may be threadedly joined to the shower pipe 105, or joined by any other suitable method including by press fitting, clamping, welds, and so on. When the shower pipe coupling member 210 and the shower pipe 105 are threadedly joined, the shower pipe coupling member 210 may have threads formed on an inner surface to mate with threads formed on an outer surface to the shower pipe 105 as shown in FIGS. 2C and 2D, or vice versa.

In some embodiments, the shower pipe coupling member's threads are national pipe taper ("NPT") threads. NPT threads provide locking resistance to substantially prevent rotation of the entire showerhead assembly relative to the shower pipe 105. More particularly, when the showerhead pivot assembly 115 (shown in FIG. 1) is positioned at an elevation above the arm pivot assembly 125, a sufficient torque around the longitudinal axis of the shower pipe 105 may be generated to unscrew the shower pipe coupling member 210 from the shower pipe 105 when using straight pipe threads such as NPSM and NPSH threads. NPT threads, in contrast, effectively resist this torque, and thus prevent the unscrewing of the shower pipe coupling member 210, which then prevents rotation of the showerhead assembly relative to the shower pipe 105. However, threads other than NPT, including NPSM and NPSH, may be used if desired.

Proximate the threads, the interior surface of the shower pipe coupling member 210 may form a groove or step for receiving a shower pipe O-ring 235 or other suitable seal element. The shower pipe O-ring 235 forms a water-tight seal between the shower pipe coupling member 210 and the shower pipe 105 to substantially prevent water from leaking through the joint formed between them.

A coupling member O-ring groove 240 may be defined in the exterior surface of the shower pipe coupling member 210 for receiving a coupling member O-ring 245 or other suitable seal element. If desired, the coupling member O-ring groove 240 may be formed in the interior surface of the arm coupling member 205 rather than formed in the exterior surface of the shower pipe coupling member 210, or may be formed in the surfaces of both members 205, 210. The coupling member O-ring 245 forms a water-tight seal at the joint between the arm coupling member 205 and the shower pipe coupling member 210 to substantially prevent water from leaking out of the shower arm attachment assembly 200 through this joint.

Still with reference to FIGS. 2C and 2D, proximate the arm coupling member 205, a snap ring groove 250 may be formed in an exterior surface of the shower pipe coupling member 210. When the arm coupling member 205 and the shower pipe coupling member 210 are joined as shown in FIGS. 2C and 2D, the snap ring groove 250 may align with a snap ring groove 255 defined in an interior surface of the arm coupling member 205. Together, these aligned snap ring grooves 250, 255 define an annular snap ring pocket for receiving a snap ring 260 or other suitable joining element. The snap ring 260 joins the arm coupling member 205 to the shower pipe 210 coupling member while allowing the arm coupling member 205 to be selectively rotated relative to the shower pipe coupling member 210 around the longitudinal axis marked A-A on FIG. 2C. By rotating the arm coupling member 205 relative to the shower pipe coupling member 210, an arm (such as the arm 120 shown in FIG. 1a) attached to the arm coupling member 205 may be rotated relative to a shower pipe 105 attached to the shower pipe coupling member 210 about longitudinal axis A-A.

Figure 2E:
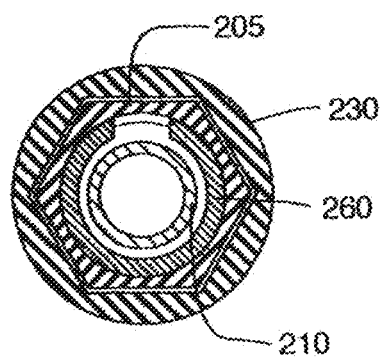
FIG. 2E depicts a cross-sectional view of the shower arm attachment assembly of FIG. 2A, viewed along line 2E-2E in FIG. 2D.
Figure 2F:
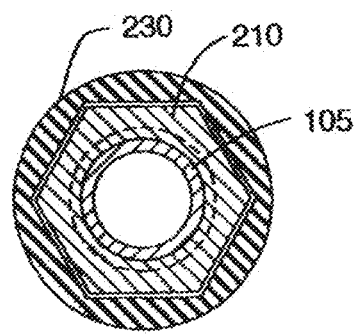
FIG. 2F depicts a cross-sectional view of the shower arm attachment assembly of 2A, viewed along line 2F-2F in FIG. 2D.

Rotation of the arm coupling member 205 relative to the shower pipe coupling member 210 may be prevented by engaging the locking sleeve 230 with each member 205, 210. More particularly, the locking sleeve 230 may be positioned over the arm coupling member 205 and the shower pipe coupling member 210, as shown in FIG. 2D. When moved to such a position, an interior surface of the locking sleeve 230 engages the outer surfaces of the arm coupling member 205 and the shower pipe coupling member 210 as shown in FIGS. 2E and 2F, thereby preventing rotation of the arm coupling member 205 relative to the shower pipe coupling member 210.

To position the locking sleeve 230 over the arm and shower pipe coupling members 205, 210, the generally flat exterior surfaces of the arm coupling member 205 are aligned with the flat surfaces of the shower pipe coupling member 210 as shown in FIG. 2A. Such alignment may be achieved by rotating the shower pipe coupling member 210 relative to the arm coupling member 205 until the generally flat exterior surfaces for each member 205, 210 align. With reference to FIGS. 2E and 2F, in one embodiment, each coupling member 205, 210 may have six substantially flat exterior surfaces, which allow the arm coupling member 205 to be placed in six rotational positions relative to the shower pipe coupling member 210 for engagement with the locking sleeve 230. Further, the locking sleeve 230 may have six generally flat interior surfaces to match and engage the substantially flat exterior surfaces of the coupling members 205, 210. The coupling members 205, 210 and the locking sleeve 230 may have more or fewer than six flat surfaces to increase or decrease the number of rotational positions of the coupling members 205, 210 relative to each other that permit the locking sleeve 230 to be slid over them. Further, other types of non-rotational surfaces, such as ovoid and D-shaped surfaces, may be used rather than substantially flat surfaces for the arm coupling member 205, the shower pipe coupling member, and the locking sleeve 230.

With reference to FIGS. 2C and 2D, the inner surface of the shower pipe 105 may define a shower pipe fluid passage 265 for delivering fluid to the are coupling member 205 from a fluid source fluidly connected to the shower pipe 105. More particularly, the shower pipe fluid passage 265 may be fluidly connected to a fluid passage 270 defined by the shower pipe coupling member's inner surface, or surfaces, to deliver fluid from the shower pipe 105 to the arm coupling member 205 via the shower pipe coupling member 210. The shower pipe coupling member fluid passage 270, in turn, may be fluidly connected to a arm coupling member fluid passage 275 defined by the arm coupling member's inner surface, or surfaces, thus delivering fluid from the shower pipe coupling member 210 to the arm coupling member 205. Finally, the arm coupling member fluid passage 275 may be fluidly connected to a showerhead to deliver fluid to the showerhead.

With reference to FIGS. 2A-2G, a method of joining the shower arm attachment assembly 200 to a shower pipe 105 will now be described. A generally cylindrical shower pipe 105 may receive a locking sleeve 230 with a generally cylindrical exterior surface. A shower pipe O-ring 235 may be placed proximate the threaded end of the shower pipe 105, and the shower pipe coupling member 210 may thread onto the shower pipe 105. The coupling member groove 240 of the shower pipe coupling member 210 receives the coupling member O-ring 245. Next, the snap ring groove 250 of the shower pipe coupling member 210 receives the snap ring 260. Pushing the snap ring's free ends together compresses it so that it may be received within the snap ring groove 250 of the shower pipe coupling 210 in order to slide the shower pipe connection portion 215 of the shower arm coupling member 205 over an end portion of the shower pipe coupling member 210.

The arm coupling member 205 may be joined to the shower pipe coupling member 210 by sliding it over the compressed snap ring 260 (and the generally annular shower pipe coupling member 210) until the snap ring groove 255 of the arm coupling member 205 aligns with the snap ring groove 250 of the shower pipe coupling member 210. Once aligned, compressive forces in the compressed snap ring 260 bias a portion of the snap ring 260 into the snap ring groove 255 of the arm coupling member 205, thereby joining the arm coupling member 205 and the shower pipe coupling member 210. Once joined, the arm coupling member 205 may be rotated relative to the shower pipe coupling member 210 around the longitudinal axis marked as A-A on FIG. 2C until its exterior flat surfaces align with the exterior flat surfaces of the shower pipe coupling member 210 in the desired relative rotational position. When aligned, the locking sleeve 230 may be slid over the arm and shower pipe coupling members 205, 210 to substantially prevent further relative rotation between the coupling members 205, 210 as described above.

A second embodiment of a shower arm attachment assembly 300 is depicted in FIGS. 3A-3G. Similar to the first embodiment shown in FIGS. 2A-2G, the second embodiment may include an arm coupling member 305 joined to a shower pipe coupling member 310. Further, the shower pipe coupling member 310 may be joined to a shower pipe 105. A locking nut 315 (or other suitable device) may join the arm coupling member 305 to the shower pipe coupling member 310. Further, as described in more detail below, the locking nut 315 may be used to selectively allow or prevent rotation of the shower pipe coupling member 310 relative to the arm coupling member 305. For example, when the locking nut 315 is substantially threadedly received on the shower pipe coupling member 310 as shown in FIG. 3A, rotation of the arm coupling member 305 relative to the shower pipe coupling member 310 around the longitudinal axis marked as B-B on FIG. 3C is prevented. Continuing with the example, when the locking nut 315 is only partially threaded onto (as shown in FIG. 3B), or unthreaded from, the shower pipe coupling member 310, the arm coupling member 305 may be rotated relative to the shower pipe coupling member 310 around the longitudinal axis marked as B-B on FIG. 3C.

With reference to FIGS. 3C and 3D, the arm coupling member 305 may have a connection portion 320 for receiving a coupling segment 325 of the shower pipe coupling member 310. A keying feature may be associated with one or both of the coupling members 305, 310 and may prevent, or otherwise substantially restrict, rotation of the arm coupling member 305 relative to the shower pipe coupling member 310. More particularly, as shown in FIG. 3E, an interior surface of the arm coupling member's connection portion 320 may include at least one groove 330 that engages with at least one projection 335 on an exterior surface of the coupling segment 325. In some embodiments, the arm coupling member's connection portion 320 may include at least one projection and the coupling segment's exterior surface may include at least one groove. Engagement of the grooves of either the arm coupling member 305 or the shower pipe coupling member 310 with the other member's projections prevents rotation of the arm coupling member 305 relative to shower pipe coupling member 310 around the longitudinal axis marked as B-B on FIG. 3C.

Returning to FIGS. 3C and 3D, the arm coupling member 305 of the second embodiment is similar to the first embodiment depicted in FIGS. 2A-2G except as noted. Between the arm coupling member's intermediate and coupling member portions 320, 325, an exterior surface of the arm coupling member 305 may be stepped to define a locking nut engagement surface 345. The locking nut engagement surface 345 may engage a flange 350 of the locking nut 315 to substantially prevent movement of the arm coupling member 305 relative to the locking nut 315 in a direction away from the shower pipe 105. Further, when the locking nut 315 is substantially threaded onto the shower pipe coupling member 310 as shown in FIG. 3C, the locking nut 315 presses the arm coupling member 305 against the shower pipe coupling member 310. Effectively, threading the locking nut 315 onto the shower pipe coupling member 310 as shown in FIG. 3C joins the arm coupling member 315 with the shower pipe coupling member 310 and substantially prevents rotation of the arm coupling member 305 relative to the shower pipe coupling member 310.

An interior surface of the arm coupling member 305 may be stepped to form a coupling member O-ring surface for positioning a coupling member O-ring 355 or other suitable seal element between the arm coupling member 205 and the shower pipe coupling member 310. Similar to the coupling member O-ring for the first embodiment of the shower arm attachment assembly 200, the coupling member O-ring 355 forms a water-tight seal between the arm and shower pipe coupling members 305, 310 to substantially prevent water from leaking through the joint formed between these members 305, 310.

The shower pipe coupling member 310 may include a lock nut connection portion 360 for joining the lock nut 315 to the shower pipe coupling member 310 and a shower pipe connection portion 365 for joining the shower pipe 105 to the shower pipe coupling member 310. The coupling segment 325, the lock nut connection portion 360, and the shower pipe connection portion 365 may be integrally formed, or may be separate elements joined together by adhesives, heat or sonic welds, any other suitable means for joining elements together, or any combination thereof.

The shower pipe coupling member 310 may be threadedly joined to the locking nut 315 as shown in FIGS. 3C and 3D, or joined by any other suitable method, including, but not limited to, by press fitting, clamping, welding, and so on. To threadedly join the shower pipe coupling member 310 to the lock nut 315, an exterior surface of the lock nut connection portion 360 may be threaded. The shower pipe coupling member 310 may also be threadedly joined to the shower pipe 105 as shown in FIGS. 3C and 3D in a manner similar to the one described above for the first embodiment.

With further reference to FIGS. 3C and 3D, the locking nut 315 may include a locking nut sidewall 370 and a locking nut flange 350. The flange 350 may extend radially inward from the locking nut sidewall 370 to engage the arm coupling member 305 as described above. An interior surface of the locking nut sidewall 370 may be threaded to threadedly join the locking nut 315 to the shower pipe coupling member 310 as discussed above. Further, a user may grip an exterior surface of the locking nut 315, such as the hand gripping grooves 375 shown in FIGS. 3A and 3B, when threading the locking nut 315 on and off the shower pipe coupling member 310.

As the locking nut 315 is threaded onto the shower pipe coupling member, the projections 335 of the showerhead coupling member 310 are received within the grooves 330 of the arm coupling member 305. As discussed above, receipt of the projections 335 within the grooves 330 prevents rotation of the arm coupling member 305 relative to the shower pipe coupling member 310. To rotate the arm coupling member 305 relative to the shower pipe coupling member 310, the locking nut 315 is unscrewed from the shower pipe coupling member 310 until the arm coupling member connection portion 320 is removed the shower pipe coupling segment 325 as depicted in FIG. 3D. Once removed, the arm coupling member 315 may be rotated relative to the shower pipe coupling member 310 around the longitudinal axis marked as B-B on FIG. 3C.

To thread the locking nut 315 onto the shower pipe coupling member 310, the projections 335 of the showerhead coupling member 310 must generally align with the grooves 330 of the arm coupling member 305 as shown in FIG. 3E. Such alignment may be obtained by selectively rotating the arm coupling member 305 relative to the shower pipe coupling member 310 around the longitudinal axis marked as B-B on FIG. 3C until the arm coupling member grooves 330 align with the shower pipe coupling member projections 335. As the number of projections 335 and corresponding grooves 330 increase or decrease, the number of relative rotational positions of the arm coupling member 305 to the shower pipe coupling member 310 respectively increases or decreases. Any number of projections 335 and corresponding grooves 330 may be used.

Similar to the first embodiment, the shower pipe 105 may be fluidly joined to an attached showerhead via fluid passages in the arm coupling member 305 and shower pipe coupling member 310.

A third embodiment of a shower arm attachment assembly 400 is depicted in FIGS. 4A-4H. Generally, the third embodiment is similar to the second embodiment. For example, the third embodiment may include an arm coupling member 405, a shower pipe coupling member 410, and a locking nut 415. The primary difference between the second and third embodiments relates to the keying mechanism for limiting rotation of the arm coupling member 405 relative to the shower pipe coupling member 410. Other features of the various components for the third embodiment of the showerhead coupling assembly are slightly modified from the second embodiment to accommodate the alternative keying feature.

Figure 4C:
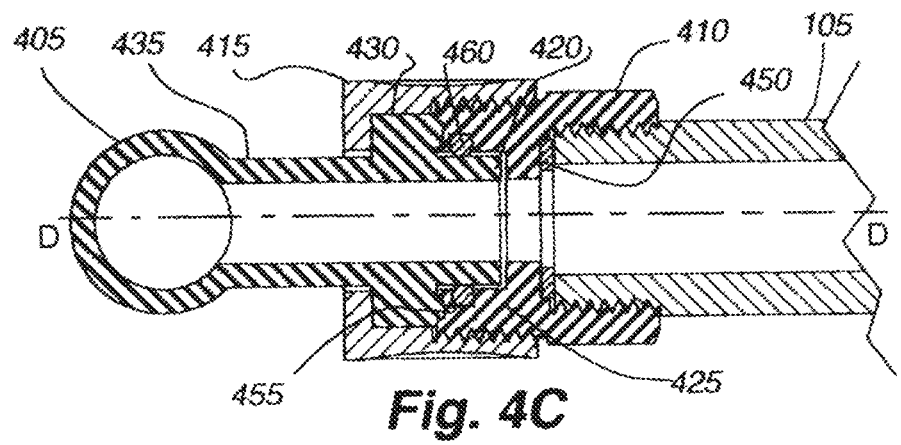
FIG. 4C depicts a cross-sectional view of the shower arm attachment assembly of FIG. 4A, viewed along line 4C-4C in FIG. 4A.
Figure 4D:
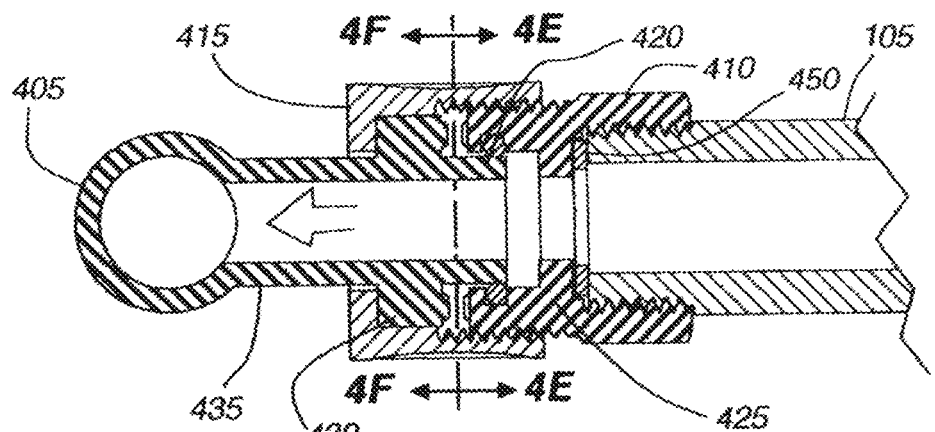
FIG. 4D depicts a cross-sectional view of the shower arm attachment assembly of FIG. 4A, viewed along line 4D-4D in FIG. 4B.
Figure 4E:
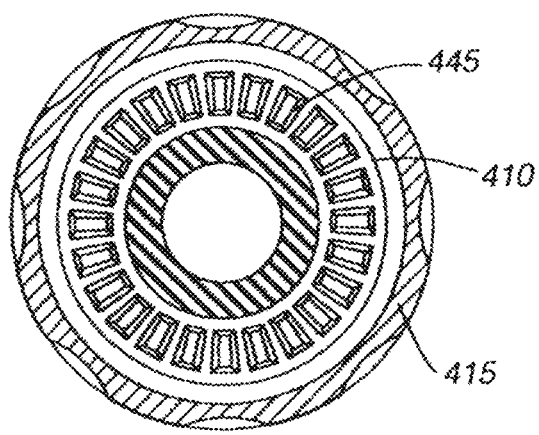
FIG. 4E depicts a cross-sectional view of the shower arm attachment assembly of FIG. 4A, viewed along line 4E-4E in FIG. 4D.
Figure 4F:
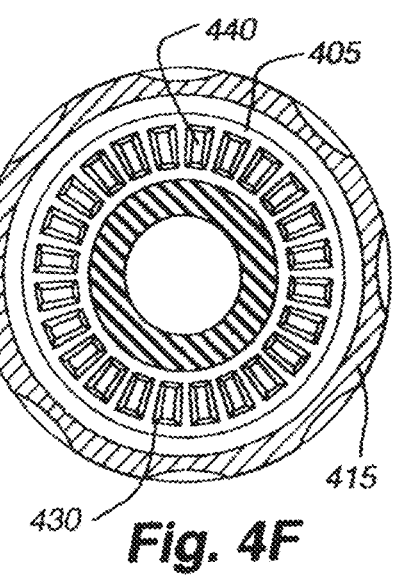
FIG. 4F depicts a cross-sectional view of the shower arm attachment assembly of FIG. 4A, viewed along line 4F-4F in FIG. 4D.

With reference to FIGS. 4C and 4D, the arm coupling member 405 may include a connection portion 420 for receipt in a coupling segment 425 of the showerhead pipe coupling member 410. Near the arm coupling member's connection portion 420, an annular keying flange 430 may extend around a shaft 435 of the arm coupling member 405. Multiple tapered arm coupling member projections 440 (see FIG. 4F) extend from a surface of the keying flange 430 abutting the shower pipe coupling member 410. The multiple arm coupling member projections 440 engage the recesses formed between multiple tapered shower pipe coupling member projections 445 (see FIG. 4E) extending from an end surface of the shower pipe coupling member 410 abutting the arm coupling member 405. When each coupling member's respective tapered projections 440, 445 are engaged with recesses formed by the other member's tapered projections, the arm coupling member 405 is prevented from rotating relative to the shower pipe coupling member 410 around the longitudinal axis marked as D-D on FIG. 4C. The other portions of the arm coupling member 405 are similar to those described above for the first and second embodiments of the showerhead coupling assembly.

In a manner similar to the one described for the second embodiment of the shower arm coupling assembly 300, the shower pipe coupling member 410 may be threadedly joined to the locking nut 415 and the shower pipe 105 as shown in FIGS. 4C and 4D, or may be joined to the shower pipe 105 by any other suitable joining means.

Similar to the second embodiment, proximate the threads for joining the shower pipe coupling member 410 to the shower pipe 105, the interior surface of the shower pipe coupling member 410 may be stepped inwardly to receive a shower pipe O-ring 450 or other suitable seal element. The shower pipe O-ring 450 forms a water-tight seal between the shower pipe coupling member 410 and the shower pipe 105 to substantially prevent water from leaking through the joint formed between them.

A coupling member seal groove 455 may be formed in the interior surface of the shower pipe coupling member 410 to receive a coupling member O-ring 460 or other suitable seal element. The coupling member O-ring 460 forms a water-tight seal between the shower pipe coupling member 410 and the arm coupling member 405 to substantially prevent fluid leaks through the joint formed between them.

The locking nut 415 is similar to the locking nut for the second embodiment of the coupling member assembly and operates in a similar manner. The locking nut 415 causes the arm coupling member projections 440 to engage the recesses formed by the shower pipe coupling member projections 445 as it is threaded onto the shower pipe coupling member 410. This engagement prevents rotation of the coupling members 405, 410 relative to each around the longitudinal axis marked as D-D on FIG. 4C. To rotate the coupling members 405, 410 relative to each other, the locking nut 415 is sufficiently unthreaded from the shower pipe coupling member 410 to disengage the projections 440, 445 from the recesses as shown in FIG. 4D. When disengaged, the arm coupling member 405 may be selectively rotated relative to the shower pipe coupling member 410 to change the relative rotation position of an attached showerhead relative to the shower pipe 105.

Further, like the second embodiment, the arm coupling member 405 may be selectively rotated to a position relative to the shower pipe coupling member 410 to properly align the projections 440, 445 with matching recesses prior to tightening the locking nut 415 onto the shower pipe coupling member 410. As the number of matching projections 440, 445 with corresponding recesses increases or decreases on each coupling member 405, 410, the number of relative rotation positions of the arm coupling member 405 to the shower pipe coupling member 410 respectively increases or decreases.

Similar to the first and second embodiments, the internal surface, or surfaces, of the arm and shower pipe coupling member 405, 410 of the third embodiment may define fluid passages for transporting fluid from a shower pipe 105 to an attached showerhead.

A fourth embodiment of a shower arm attachment assembly 500 is depicted in FIGS. 5A and 5B. Like the previously described embodiments, this embodiment of the showerhead attachment assembly 500 may be used in an arm assembly, such as the arm assembly 110 shown in FIG. 1A. The fourth embodiment may include a stud 505 connected to an arm cross-member 510. The stud 505 may be fused to the arm cross-member 510, or otherwise suitably joined, to form a high strength, water-tight connection. Alternatively, the stud 505 may be integrally formed with the arm cross-member 510.

The stud 505 may be joined to a tee 515 using threads. The stud 505 may be selectively rotated relative to the tee 515. The tee 515 may include a tee flange 520 extending from a tee shaft 525 for engagement with a stepped, interior surface of a shower pipe nut 530. The tee 515 may be connected to a shower pipe 105 by abutting the tee flange 520 with the stepped interior surface of the nut 530 and threading the shower pipe nut 530 onto the shower pipe 105 as depicted in FIG. 5B. When the stud is joined to the tee 515, and the tee 515 is joined to the shower pipe 105, the stud 505 may be selectively rotated relative to the tee 515. A jam nut 535 may be threaded onto the tee 515 to substantially prevent rotation of the tee 515 relative to the stud 505. A hole in the jam nut 535 for receiving the tee shaft 525 may be sized slightly smaller than the outer diameter of the tee shaft 525, thus compressing the tee shaft 525 slightly inward onto the stud 505. Such compression locks the tee shaft 525 onto the stud 505, thus substantially limiting rotation of the tee shaft 525 relative to the stud. As the jam nut 535 is thread off the tee shaft 525, the tee shaft 525 is allowed to uncompress, thus allowing the stud 505 to be rotated relative to the tee shaft 525. Accordingly, sufficiently threading the jam nut 535 onto the tee 515 will substantially prevent rotation of the stud 505 relative to the tee 515 while sufficiently unthreading the jam nut 535 from the tee 515 will allow the stud 505 to be rotated relative to the tee 515.

A shower pipe resilient washer 540 may be placed between the tee flange 520 and the shower pipe 105 to form a water-tight seal between the tee 515 and the shower pipe 105, which prevents water from leaking through the joint formed between the tee 515, the shower pipe 105, and the shower pipe nut 530. Similarly, a stud washer 545 may be placed between an interior stepped surface of the tee 515 and the stud 505 to form a water-tight seal between the tee 515 and the stud 505, which prevents water from leaking through the joint formed between the tee 515 and the stud 505. Fluid passages may be defined by inner surfaces of the tee 515 and the stud 505 to convey fluid from the shower pipe 105 to an attached showerhead.

Any of the various components for the various embodiments of the arm assembly, including, but not limited to, the components of the shower arm attachment assembly, may be formed of plastic, metal, ceramic, any other suitable metal, or any combination thereof. Further, any of various components for the arm assembly may be integrally formed or may be formed from two or more parts joined by any suitable joining method.

All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A shower arm assembly comprising
   a tubular arm with a transverse connection portion at a first end; and
   a shower arm attachment assembly rotatably connected to the transverse connection portion and including
      an arm coupling member configured to both allow rotation of the arm with respect thereto and fixedly interface with the transverse connection portion at multiple positions; and
      an arm rotation assembly including
         a connector rod comprising a threaded portion at a first end and a flange at a second end and positioned axially within a portion of the arm coupling member and axially within the transverse connection portion of the arm;
         a nut joined to the connector rod at the threaded end and operative with the connector rod to releasably press together the arm coupling member and the transverse connection portion of the arm; and
         a retaining clip slideably attached to and directly engaging the connector rod between the threaded portion and the flange and statically positioned with respect to the transverse connection portion of the arm to prevent disassembly of the arm from the arm coupling member independent of the nut.

2. The shower arm assembly of claim 1, wherein the arm rotation assembly further comprises a sleeve and a sleeve washer positioned about the connector rod between the transverse connection portion of the arm and the nut.

3. The shower arm assembly of claim 2, wherein the retaining clip is positioned between the sleeve washer and the transverse connection portion of the arm.

4. The shower arm assembly of claim 2, wherein tightening the nut on the threaded end causes the nut to bear against sleeve, and the sleeve to bear against the transverse connection portion of the arm, pressing the arm and arm coupling member together.

5. The shower arm assembly of claim 3, wherein disassembly of the arm from the arm coupling member is stopped by the retaining clip engaging the threaded portion of the connector rod.

6. The shower arm assembly of claim 1, wherein:
   the arm coupling member includes a first keying feature and the transverse connection portion of the arm includes a second keying feature for engagement with the first keying feature to substantially prevent rotation of the arm relative to the arm coupling member; and
   pressing the arm coupling member and the arm together using the arm rotation assembly engages the first and second keying features.

7. The shower arm assembly of claim 6, wherein:
   the arm coupling member includes a third keying feature; and
   the shower arm attachment assembly further includes:
      a shower pipe coupling member operative for attachment to a shower pipe and including a fourth keying feature for engagement with the third keying feature to substantially prevent rotation of the shower pipe coupling member relative to arm coupling member; and
      a locking nut selectively engageable with the arm coupling member and the shower pipe coupling member, wherein engagement of the locking nut with the arm coupling member and the shower pipe coupling member joins the arm coupling member with the shower pipe coupling member and engages the third keying feature with the fourth keying feature.

8. A shower arm assembly comprising:
an arm including a first keying feature;
a shower arm attachment assembly rotatably connected to the arm comprising
- an arm coupling member including a second keying feature for engagement with the first keying feature to substantially prevent rotation of the arm relative to the arm coupling member; and
- an arm rotation assembly including
  - a connector rod positioned within the arm coupling member and within a portion of the arm and configured to be in fluid communication with a fluid flowing through the arm rotation assembly, the connector rod comprising a first end configured to engage and seal against the arm coupling member and a threaded portion at a second end that extends beyond the arm;
  - a nut joined to the threaded portion of the connector rod and operative with the connector rod to releasably press together the arm coupling member and the arm to engage the first keying feature with the second keying feature; and
  - a retaining clip slideably attached to and directly engaging the connector rod between the first end of the connector rod and the threaded portion at the second end and statically interfacing with the arm such that the retaining clip is operative with the connector rod to prevent disassembly of the arm from the arm coupling member independent of the nut.

9. The shower arm assembly of claim 8, wherein
the arm coupling member includes a third keying feature; and
the shower arm attachment assembly further includes
- a shower pipe coupling member operative for attachment to a shower pipe and including a fourth keying feature for engagement with the third keying feature to substantially prevent rotation of the shower pipe coupling member relative to arm coupling member; and
- a locking nut selectively engageable with the arm coupling member and the shower pipe coupling member, wherein engagement of the locking nut with the arm coupling member and the shower pipe coupling member joins the arm coupling member with the shower pipe coupling member and engages the third keying feature with the fourth keying feature.

10. The shower arm assembly of claim 8, wherein disassembly of the arm from the arm coupling member is stopped by the retaining clip engaging the threaded portion of the connector rod.

11. A shower arm assembly comprising:
an arm defining a fluid flow conduit and including a first keying feature;
a shower arm attachment assembly rotatably connected to the arm comprising;
- an arm coupling member including a second keying feature for engagement with the first keying feature to substantially prevent rotation of the arm relative to the arm coupling member; and
- an arm rotation assembly defining a fluid flow passage in fluid communication with the fluid flow conduit and including
  - a connector rod comprising a threaded end and a flange at an opposite end, wherein the connector rod defines at least a portion of the fluid flow passage;
  - a nut joined to the threaded end of the connector rod and operative with the connector rod to releasably press together the arm coupling member and the arm to engage the first keying feature with the second keying feature; and
  - a retaining clip slideably attached to and directly engaging the connector rod between the threaded end and the flange and statically interfacing with the arm such that the retaining clip is operative with the connector rod to prevent disassembly of the arm from the arm coupling member independent of the nut.

12. The shower arm assembly of claim 11, wherein the flange of the connector rod forms a wall bounding the fluid flow passage.

13. The shower arm assembly of claim 11, wherein disassembly of the arm from the arm coupling member is stopped by the retaining clip engaging the threaded portion of the connector rod.

* * * * *